United States Patent
Marcheret

(10) Patent No.: US 9,311,609 B2
(45) Date of Patent: Apr. 12, 2016

(54) TECHNIQUES FOR EVALUATION, BUILDING AND/OR RETRAINING OF A CLASSIFICATION MODEL

(71) Applicant: Nuance Communications, Inc., Burlington, MA (US)

(72) Inventor: Etienne Marcheret, White Plains, NY (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 14/686,099

(22) Filed: Apr. 14, 2015

(65) Prior Publication Data

US 2015/0220853 A1 Aug. 6, 2015

Related U.S. Application Data

(62) Division of application No. 13/429,041, filed on Mar. 23, 2012, now Pat. No. 9,031,897.

(51) Int. Cl.
*G06N 99/00* (2010.01)
*G06N 7/00* (2006.01)

(52) U.S. Cl.
CPC ............... *G06N 99/005* (2013.01); *G06N 7/00* (2013.01); *G06N 7/005* (2013.01)

(58) Field of Classification Search
None
See application file for complete search history.

(56) References Cited

U.S. PATENT DOCUMENTS

| | | | |
|---|---|---|---|
| 6,937,994 B1 | 8/2005 | Iyengar | |
| 7,318,022 B2 | 1/2008 | Li | |
| 8,291,069 B1 * | 10/2012 | Phillips | 709/224 |
| 8,515,736 B1 | 8/2013 | Duta | |
| 8,560,477 B1 * | 10/2013 | Petrov et al. | 706/46 |
| 2008/0086433 A1 * | 4/2008 | Schmidtler et al. | 706/12 |
| 2009/0063145 A1 | 3/2009 | Hakkani-Tur et al. | |
| 2009/0092299 A1 | 4/2009 | Jerebko et al. | |
| 2011/0071965 A1 * | 3/2011 | Long et al. | 706/12 |
| 2011/0202487 A1 | 8/2011 | Koshinaka | |
| 2011/0320387 A1 | 12/2011 | He et al. | |
| 2012/0054184 A1 | 3/2012 | Masud et al. | |
| 2012/0263376 A1 | 10/2012 | Wang et al. | |

OTHER PUBLICATIONS

Dai et al, Transferring Naïve Bayes Classifiers for Text Classification, 2007.*
Huang et al, Correcting Sample Selection Bias by Unlabeled Data, 2007.*
Sugiyama et al, Direct Importance Estimation with Model Selection and Its Application to Covariate Shift Adaptation, 2008.*
Zadrozny et al, Cost-Sensitive Learning by Cost-Proportionate Example Weighting, 2003.*
Minkov et al., NER Systems that Suit User's Preferences: Adjusting the Recall-Precision Trade-off for Entity Extraction, Proceedings of the Human Language Technology Conference of the North American Chapter of the ACL, Jun. 2006, 93-6, Association for Computational Linguistics, New York, NY.
Nigam et al., Text Classification from Labeled and Unlabeled Documents using EM, Machine Learning, May 2000, 39(2-3):103-34, Kluwer Academic Publishers, The Netherlands.

* cited by examiner

*Primary Examiner* — Stanley K Hill
*Assistant Examiner* — Mikayla Chubb
(74) *Attorney, Agent, or Firm* — Wolf, Greenfield & Sacks, P.C.

(57) ABSTRACT

Techniques for evaluation and/or retraining of a classification model built using labeled training data. In some aspects, a classification model having a first set of weights is retrained by using unlabeled input to reweight the labeled training data to have a second set of weights, and by retraining the classification model using the labeled training data weighted according to the second set of weights. In some aspects, a classification model is evaluated by building a similarity model that represents similarities between unlabeled input and the labeled training data and using the similarity model to evaluate the labeled training data to identify a subset of the plurality of items of labeled training data that is more similar to the unlabeled input than a remainder of the labeled training data.

4 Claims, 10 Drawing Sheets

TECHNIQUES FOR EVALUATION, BUILDING AND/OR RETRAINING OF A CLASSIFICATION MODEL

RELATED APPLICATIONS

This application is a divisional claiming the benefit under 35 U.S.C. §120 of U.S. patent application Ser. No. 13/429,041 filed Mar. 23, 2012 and entitled "Techniques for Evaluation, Building and/or Retraining of a Classification Model," which is incorporated herein by reference in its entirety.

BACKGROUND

1. Field of Invention

The techniques described herein are directed generally to the field of input classification, and more particularly to techniques for performing evaluation, building and/or retraining of a classification model.

2. Description of the Related Art

Classification is the process of determining a class for a given data input. For example, binary classification may be used to classify a data input into one of two classes. One environment in which classification is performed is in connection with an automatic speech recognition (ASR) system that processes speech and may, for each segment of speech, provide output for a word or phrase that the ASR system has determined is a representation of the speech. Binary classification may be used to determine whether each ASR output belongs in the 'accept' class, or the 'reject' class, wherein the class is an indication of whether the ASR output is to be accepted as correct or rejected as incorrect, respectively.

A classification model is a statistical model constructed with the aim of correctly associating a given data input with a class. A classification model may be constructed using supervised training, in which inputs with labels identifying their known classes are used to train the classification model. The classification model is thereby able to learn how to correctly assign classes based on the labeled training data, and may then be used to determine the classes of unlabeled input for which the class is unknown.

SUMMARY

In one embodiment, there is provided a method of processing a first classification model that classifies an input into one of a plurality of classes, wherein the first classification model was built using labeled training data having a first set of weights, wherein each item of labeled training data is labeled with one of the plurality of classes, the method comprising acts of: obtaining unlabeled input for the first classification model; using the unlabeled input to reweight the labeled training data to have a second set of weights that is different from the first set of weights; and using the labeled training data reweighted according to the second set of weights to retrain the first classification model; and/or build a second classification model. In another embodiment, there is provided a method for use with a first classification model that classifies an input into one of a plurality of classes, wherein the first classification model was built using labeled training data, wherein the labeled training data comprises a plurality of items of labeled training data, wherein each of the plurality of items of labeled training data is labeled with one of the plurality of classes, the method comprising acts of: obtaining unlabeled input for the first classification model; building a similarity model that represents similarities between the unlabeled input and the labeled training data; and using a programmed processor and the similarity model to evaluate the labeled training data to identify a subset of the plurality of items of labeled training data that is more similar to the unlabeled input than a remainder of the labeled training data.

In a further embodiment, there is provided a tangible computer-recordable medium having a plurality of instructions embodied therein, wherein the plurality of instructions, when executed by a processor, cause a machine to perform a method of processing a first classification model that classifies an input into one of a plurality of classes, wherein the first classification model was built using labeled training data having a first set of weights, wherein each item of labeled training data is labeled with one of the plurality of classes, the method comprising acts of: obtaining unlabeled input for the first classification model; using the unlabeled input to reweight the labeled training data to have a second set of weights that is different from the first set of weights; and using the labeled training data reweighted according to the second set of weights to retrain the first classification model; and/or build a second classification model.

In a further embodiment, there is provided a tangible computer-recordable medium having a plurality of instructions embodied therein, wherein the plurality of instructions, when executed by a processor, cause a machine to perform a method for use with a first classification model that classifies an input into one of a plurality of classes, wherein the first classification model was built using labeled training data, wherein the labeled training data comprises a plurality of items of labeled training data, wherein each of the plurality of items of labeled training data is labeled with one of the plurality of classes, the method comprising acts of: obtaining unlabeled input for the first classification model; building a similarity model that represents similarities between the unlabeled input and the labeled training data; and using a programmed processor and the similarity model to evaluate the labeled training data to identify a subset of the plurality of items of labeled training data that is more similar to the unlabeled input than a remainder of the labeled training data.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1A:
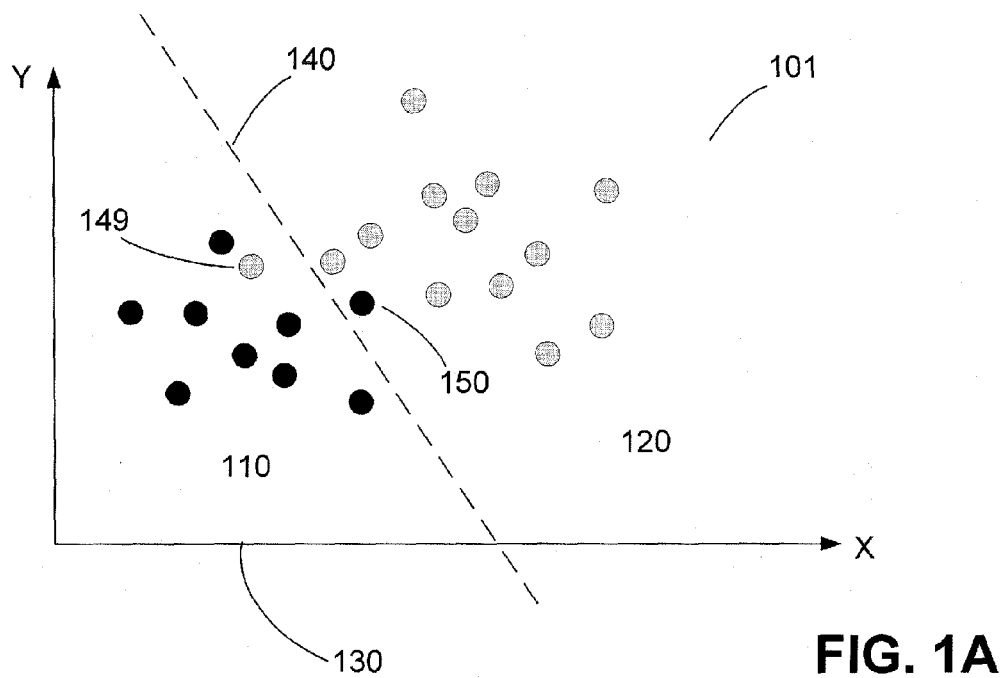
FIG. 1A is a plot illustrating labeled training data that can be used in supervised training of a classification model.

The inventor has recognized and appreciated that the distribution of labeled training data (sometimes referred to simply as 'training data') used to train a classification model and the distribution of unlabeled input data (sometimes referred to as unlabeled test data, or simply 'test data') that the classification model is called upon to classify in a particular use environment may not be the same, which may lead to suboptimal performance of the classification model.

Unlabeled test data may differ in some way from the labeled training data used to train the classification model. For example, a classification model may be trained on labeled data created by an ASR system processing the speech of one or more users. The classification model could then be used to classify unlabeled input comprising speech from one or more new users. The new user(s) may have speech characteristics and/or may be speaking in one or more environments that differ from the speech characteristics and/or speaking environments of the one or more users used to train the classification model, which may result in the classification model performing differently than expected on the test data.

In accordance with some embodiments, an improved classification model may be generated by identifying similarities between unlabeled test data and labeled training data. For example, by understanding features of the unlabeled test data that are similar to features in the labeled training data, the labeled training data may be reweighted and the classification model may be retrained to improve performance of the classification model for the particular use case with the distribution of unlabeled test data. The labeled training data may be reweighted, for example, by modifying one or more weight values associated with the items of labeled training data. The classification model may be retrained in an unsupervised fashion to achieve a desired level of performance (i.e., without requiring supervised labeling of the test data), and the performance of the retrained classification model on the unlabeled test data may closely match that of the model on the reweighted labeled training data.

The inventor has further recognized that, due to differences between the training data and the test data, the performance of a classification model in a particular use case may be unpredictable, which may be undesirable for some use cases. For example, in a particular use case it may be important to achieve a specified degree of performance for the classification model (e.g., a specified false accept rate for a percentage of inputs incorrectly accepted as belonging to a particular class). While a classification model may be built on training data and may achieve the desired performance on the training data, differences between the training data and test data may result in unpredictability in how the model will perform on training data and whether it will deliver the expected level of performance. It may consequently be desirable to determine the performance of the classification model in a particular use environment on the particular test data of that environment.

In some embodiments, the performance of a classification model in a use environment having a particular distribution of unlabeled test data is determined. This may be done in any suitable way. In one embodiment, a subset of the labeled training data that has similar features to those in the unlabeled test data is identified and the performance of the classification model may be determined for the identified subset of labeled training data. Due to the identified similarities between the subset of labeled training data and the unlabeled test data, the performance of the classification model on the subset of labeled training data provides an indication of the performance of the classification model on the unlabeled test data. The performance of the classification model on the unlabeled test data may thereby be determined.

Information relating to the performance of the model may then be presented. This may be desirable because it may allow an individual (e.g., an administrator of a system) to evaluate how the classification model is performing in the particular use environment, to either gain comfort that it is performing at a desired level, or to determine that it is not so that some action may be taken.

In some embodiments, a classification model is improved to provide a specified degree of performance on a particular set of unlabeled test data for a particular use environment. This may be done in any suitable way. In accordance with one embodiment described below, by determining the actual performance of the classification model on test data for a use environment, a transformation of the training data may be performed based on a desired performance of the classification model on that test data. The performance of the classification model will thereby be improved to provide a specified degree of performance on the test data in the particular use environment.

In some embodiments, a similarity model representing similarities between labeled training data and unlabeled input data is generated. By understanding features of the unlabeled test data that are similar to features in the labeled training data, a model of these similarities may be generated. In some use cases, the similarity model may be used to determine the performance of the classification model on the unlabeled test data. For example, the similarity model may be used to identify a subset of the labeled training data that has features similar to those in the unlabeled test data, as described above. In some other use cases, the similarity model may be used to improve the performance of a classification model for a particular distribution of unlabeled test data. For example, the similarity model may be used to reweight the labeled training data and the classification model trained using the labeled training data may be retrained using the reweighted training data to improve performance of the classification model for the environment having the distribution of unlabeled test data. In yet a further use case, a similarity model may be used to identify items of unlabeled test data that are less similar to the labeled training data than a remainder of the unlabeled test data. Labels for these items of unlabeled test data may be obtained, and the classification model that was trained using the original labeled training data may be retrained using the new labeled training data to improve performance of the classification model for the environment having the distribution of test data.

As discussed above, some embodiments relate to the retraining of a classification model. A classification model may comprise any suitable classification algorithm (also known as a 'classifier'), non limiting examples of which include logistic regression, support vector machine (SVM) and an exponential family model. In some embodiments described below, the classification model performs binary classification. However, aspects of the present invention described herein are not limited in this respect, and may also be applied to multiclass classification models. Aspects of the present invention described herein are not limited to particular implementations of classification models, and can be used with any suitable classification model.

In some embodiments described in detail below, the classification model is applied to the output of an automatic speech recognition (ASR) system, and the decision to accept or reject the output as belonging to a particular class is determined by the classification model. In such an application, the classification model may be trained as a binary classifier that classifies results output by an ASR system into an 'accept' class or a 'reject' class, or as a multiclass classifier that classifies results output by an ASR system into 'accept', 'reject' or 'reconfirm' classes—where a 'reconfirm' class indicates an ASR result that is to be manually assigned to either the 'accept' or 'reject' class by a user of the system. These use cases are provided only as examples, as aspects of the invention described herein are not limited to any particular application or use case for a classification model, and can be used with classifiers that classify any type of data.

Figure 1B:
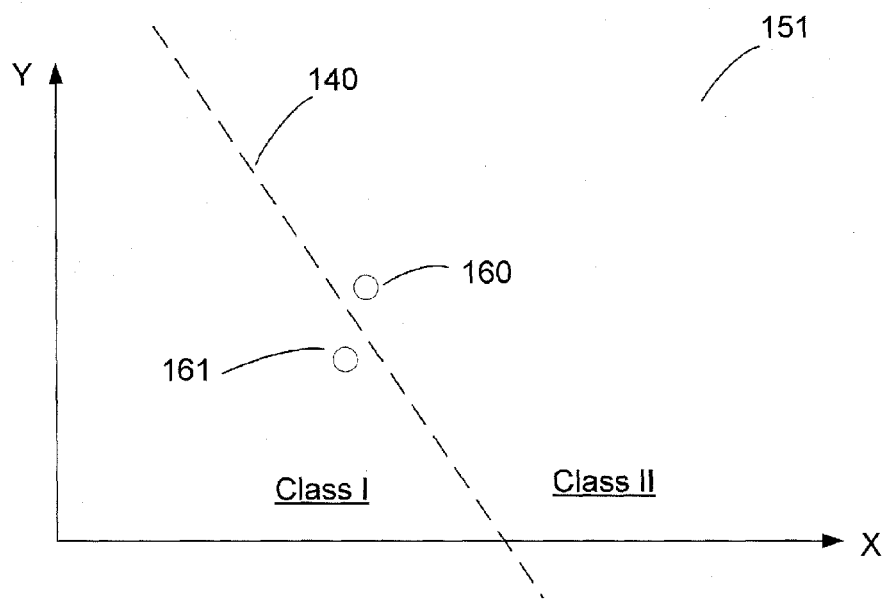
FIG. 1B is a plot illustrating unlabeled test data classified by the classification model trained using the training data depicted in FIG. 1A.

As discussed above, a classification model may determine one or more classes for unlabeled input. FIGS. 1A and 1B are illustrative examples of labeled training data that may be used in supervised training of a classification model (FIG. 1A), and unlabeled input that may be classified by the classification model (FIG. 1B).

FIG. 1A shows an example of labeled training data that may be used to train a classification model. In FIG. 1A, plot 101 shows data points belonging to Class I (black circles) and Class II (grey circles). In the example of FIG. 1A, each data point occupies a position in a two-dimensional space defined by parameters X and Y, as shown by axes 130. Each data point has a value for parameter X and a value for parameter Y that determine its position in plot 101.

In the example of FIG. 1A, the data points in plot 101 are 'labeled' in that their classes are known. This data may be used to perform supervised training of a classification model. As discussed above, a classification model may be trained to use any suitable approach or algorithm for classifying data. In the example of FIG. 1A, the classification model is trained as a linear classifier. That is, after training, the classification model will assign a class to an unlabeled input based on a linear boundary such as decision boundary 140, so that an unlabeled data point to the left of decision boundary 140 (having a lower X value than the X value on the boundary 140 having the same Y value) will be assigned to Class I and that an unlabeled data point to the right of decision boundary 140 (having a higher X value than the X value on the boundary 140 having the same Y value) will be assigned to Class II. Decision boundary 140 is an infinitely-long line, a section of which is shown in FIG. 1A. The decision boundary 140 in FIG. 1A does the best job possible of minimizing the number of misclassified data points using a linear classifier, as only two data points 149 and 150 are misclassified. In this respect, there is no straight line that can be drawn through the data points in plot 101 that will act as a decision boundary that correctly classifies every labeled data point. Data point 149 is a 'false positive' classification for Class I and data point 150 is a 'false negative' classification for Class I.

FIG. 1B depicts plot 151 in which unlabeled input items 160 and 161 are classified by the classification model trained on the labeled data shown in FIG. 1A, by being compared with decision boundary 140. Since unlabeled input 160 lies to the right of decision boundary 140, it is assigned to Class II, and since unlabeled input 161 lies to the left of the decision boundary, it is assigned to Class I. Since input items 160 and 161 are unlabeled, the correct class assignments are not known, but it is hoped that the classification model will accurately predict the correct classes.

The decision boundary 140 shown in FIG. 1A is but one example. A decision boundary may be determined to equally balance the number of false positives and false negatives that result from classification, to minimize the number of false positives or false negatives (as selecting the boundary to minimize one typically results in an increase in the other, or to achieve any other desired performance in trading off the number of false positives and false negatives. For example, if FIGS. 1A and 1B were to represent a case in which the misclassification of a Class I data point as a Class II data point was highly undesirable, the classification model may be trained so that decision boundary 140 was situated further to the right of the location shown in FIG. 1A. This would ensure that at least some data points with higher values of X and/or Y would be correctly classified as Class I data points, at the cost of incorrectly misclassifying more Class II data points as Class I data points.

It should be appreciated that the FIGS. 1A and 1B example of training a classification model is a simple illustrative example provided for ease of explanation. Any number of data points (including many more than shown above, including potentially thousands) labeled in any number of classes may be used to train a classification model. Data points may be situated in a space comprising any number of dimensions (including many more than the two dimensions shown in the example), wherein a data point described by N values, or 'features', occupies a location in an N-dimensional space, known as a feature space. Furthermore, the use of a linear classifier to generate a classification model is provided merely as an example, as aspects of the invention described herein are not limited to use with a classification model that employs a linear classifier.

As described above, differences in the distribution of test data from the distribution of the training data may impact the performance of the classification model so that its performance may be unpredictable and/or sub-optimal in a particular use environment. For example, if in the example of FIG. 1B the unlabeled input tends to have slightly higher values of parameter X than the labeled training data, the classification model trained in the example of FIG. 1A may misclassify more Class I data points as Class II data points than would be expected based on the training of the classification model. Thus, the classification model would have a higher rate of false negatives in actual use with the test data than was expected based on the training data, and the actual rate may be unpredictable. For an environment where the model was trained and desired to have a low false negative rate, the higher rate of false negatives may be undesirable.

Figure 2:
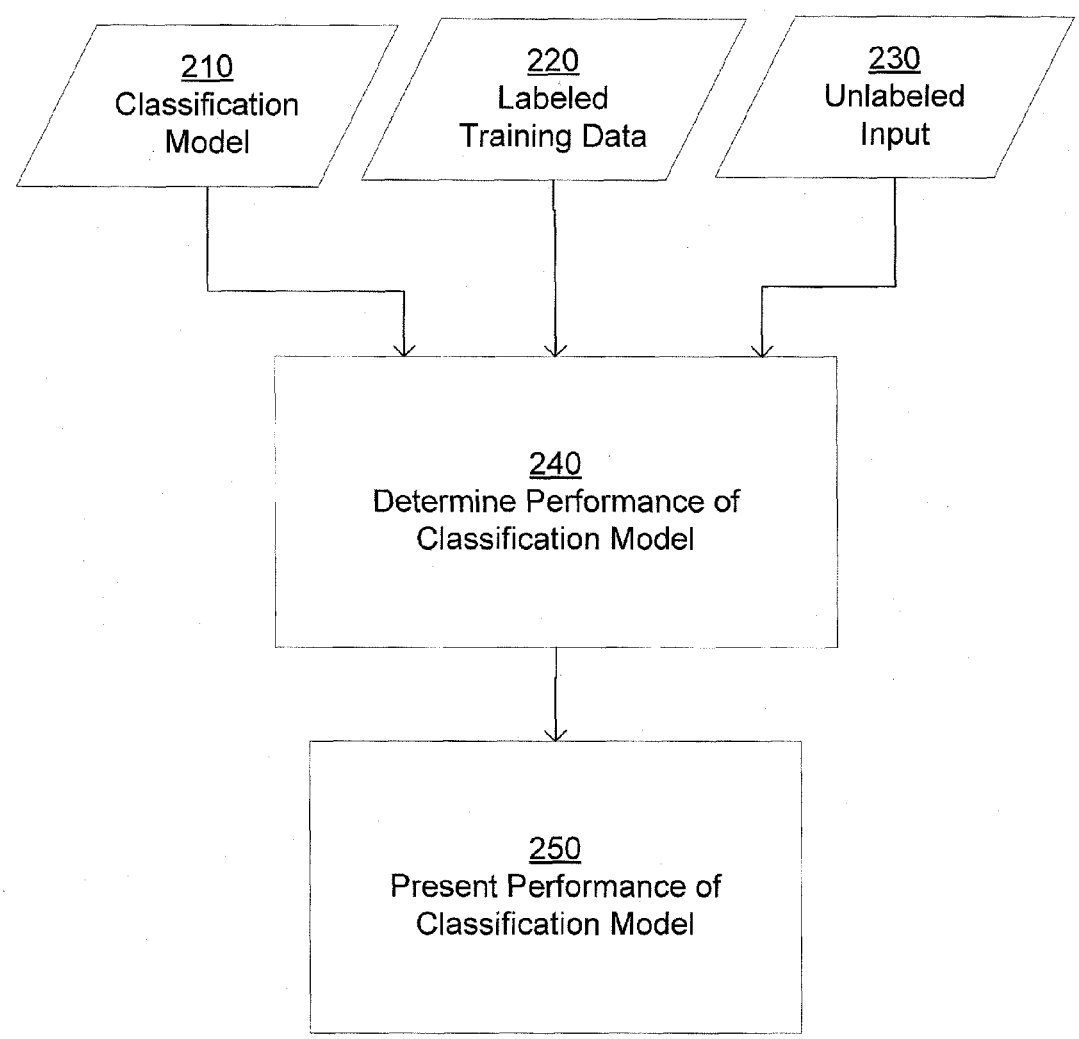
FIG. 2 is a flow chart of an exemplary method of determining the performance of a classification model and presenting the performance of the classification model, in accordance with some embodiments of the present invention.

In some embodiments, the performance of a classification model is determined and presented. FIG. 2 is a flow chart of one non-limiting illustrative method 200 that determines the performance of a classification model and presents the performance of the classification model so that it can be observed. The inputs to method 200 comprise a classification model 210, labeled training data 220 and unlabeled input 230. Classification model 210 was built using the labeled training data 220 and designed to classify items of labeled training data and unlabeled input data into one of a plurality of classes. The classification model 210 may have been built in any suitable manner and classification model 210 may use any suitable classification algorithm, examples of both of which are described above.

In the example of FIG. 2, classification model 210, labeled training data 220 and unlabeled input 230 are used in act 240 to determine the performance of the classification model 210 on the unlabeled input 230. Any suitable technique may be used to determine the performance of the classification model. In one non-limiting example, the performance of the classification model on the unlabeled input may be determined by identifying items of labeled training data that are similar to the items of unlabeled input, and by determining the performance of the classification model when operating only on the identified items of labeled training data. Such a non-limiting example is described in further detail below.

In act 250 the performance of the classification model 210 on the unlabeled input 230 is presented. Presentation of the performance of the classification model may comprise displaying data via a computing device, as described in greater detail below, but this is only one non-limiting example, as any technique for presenting information to a user of the system may be used. As described above, this may be useful because it may allow a user of the system, such as an administrator, to evaluate how the classification model is performing in the particular use environment, to either gain comfort that it is performing at a desired level, or to determine that it is not so that some action may be taken.

Figure 3:
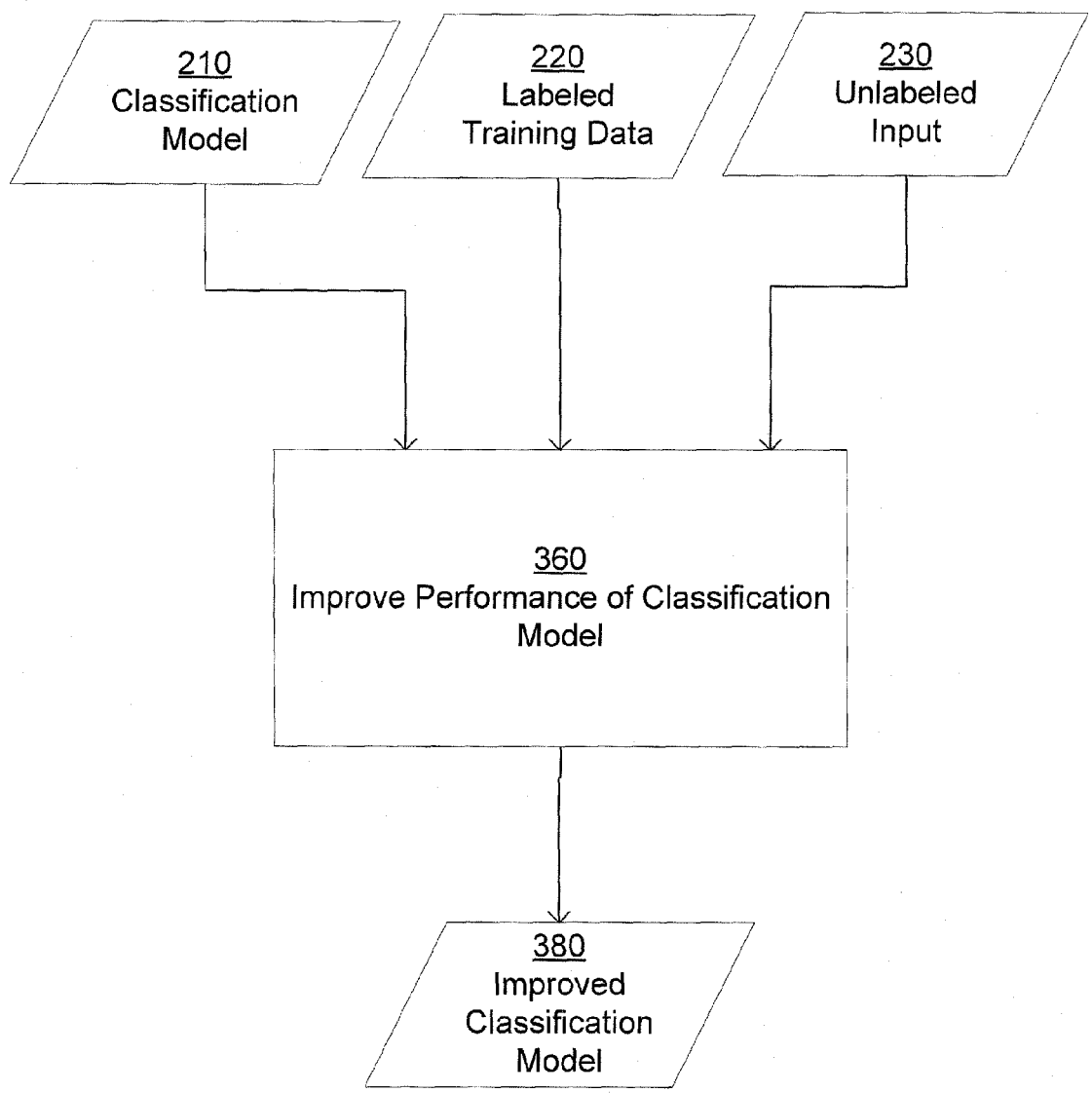
FIG. 3 is a flow chart of an exemplary method of determining the performance of a classification model and improving the performance of the classification model, in accordance with some embodiments of the present invention.

In another embodiment, the performance of a classification model is improved. FIG. 3 is a flow chart of one non-limiting illustrative method 300 that improves the performance of the classification model on a particular distribution of test data. The inputs to method 300 comprise classification model 210, labeled training data 220 and unlabeled input 230, as shown and described in FIG. 2.

Method 300 in FIG. 3 uses classification model 210, labeled training data 220 and unlabeled input 230 in act 240 to improve the performance of the classification model 210 on the unlabeled input 230 in act 360. Improving of the classification model may be performed in any suitable way. As one non-limiting example, in act 360 the classification model 210 may be improved to obtain a specified degree of performance of the classification model on unlabeled test data, and the improvement may use performance data such as that determined in act 240 to determine how the classification model performs on the unlabeled test data. However, aspects of the present invention described herein are not limited in this respect, as improvement of the classification model may be performed in any suitable way, and may include generation of a new classification model and/or retraining of an existing classification model. An improved classification model 380 is generated as a result of the actions performed in act 360.

FIGS. 4-8, described in further detail below, show non-limiting examples of techniques for performing some or all of the acts described in FIGS. 2 and 3. The below examples may be implemented in any suitable way and are not limited to any particular classification model, classification algorithm, or method of training a classification model.

In accordance with one embodiment, the performance of a classification model may be improved for a distribution of unlabeled test data by retraining the classification model based on labeled training data in an unsupervised manner.

Figure 4:
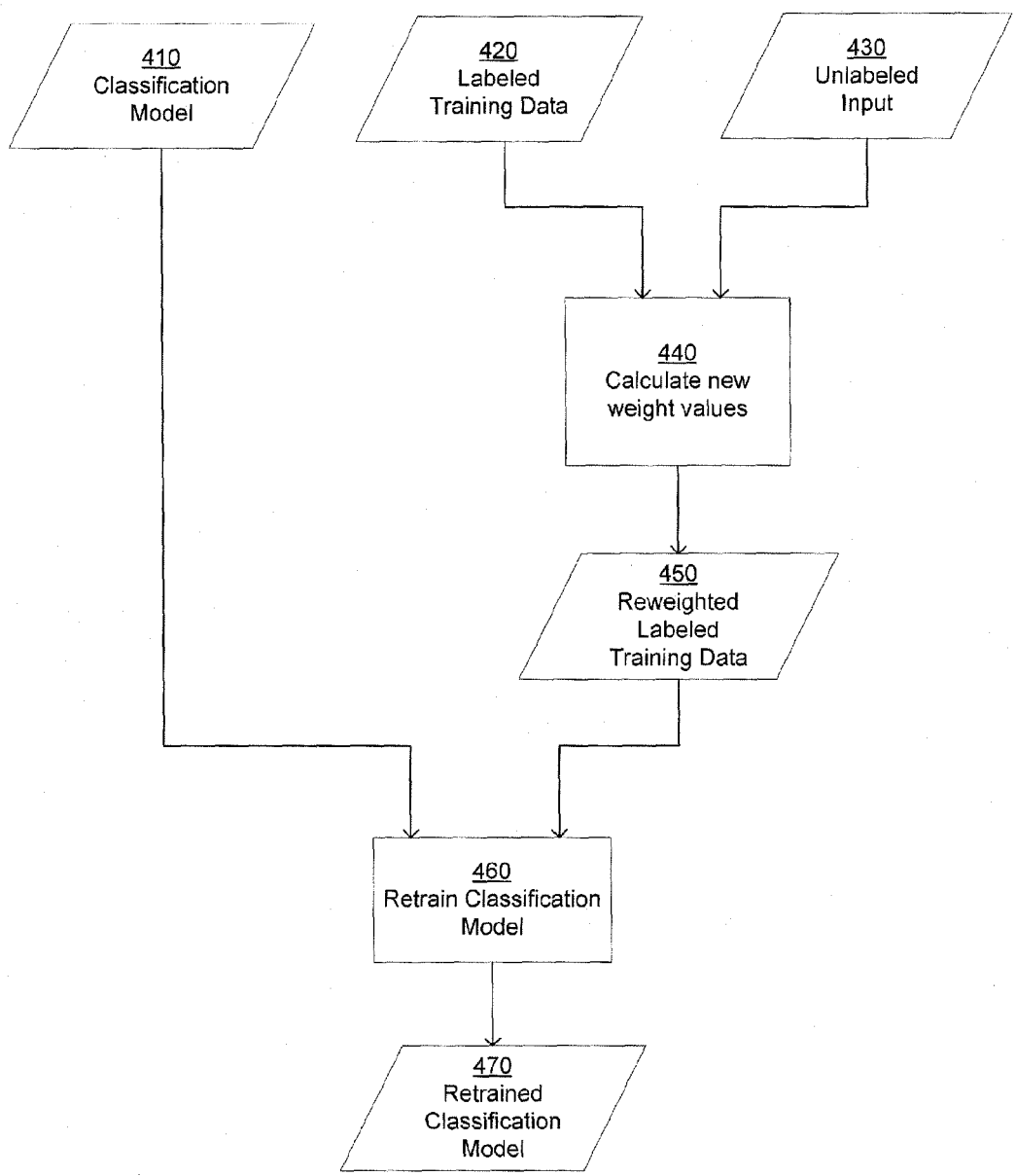
FIG. 4 is a flow chart of an exemplary method that performs unsupervised retraining of a classification model, in accordance with some embodiments of the present invention.

FIG. 4 is a flow chart of one non-limiting illustrative method 400 that performs such unsupervised retraining of a classification model. While the unsupervised retraining described in FIG. 4 is used in one embodiment to improve the classification model for a distribution of unsupervised training data, it should be appreciated that the aspect of the invention that relates to unsupervised retraining using labeled training data is not limited in this respect and can be used for any suitable purpose.

The inputs to method 400 comprise a classification model 410, labeled training data 420 that was used to build classification model 410, and unlabeled input 430. The output from method 400 is retrained classification model 470 that will achieve performance on the distribution of unlabeled input that is improved in at least one respect as compared with classification model 410. As mentioned above, classification model 410 was built using the labeled training data 420. The classification model 410 may have been built in any suitable manner, examples of which are described above, and classification model 410 may use any suitable classification algorithm.

Labeled training data 420 may be associated with a set of weights that may be used to specify the relative contribution of each item of labeled training data to the classification model 410. For example, a higher weight value associated with one or more items of labeled training data results in these items having a greater relative contribution to the building of the classification model than items of labeled training data associated with a lower weight value. The weighting of the labeled training data may have been performed in any suitable way, as aspects of the present invention described herein are not limited to use with models that are built using training data that is weighted in any particular way and can, for example, be used with models wherein the training data is all evenly weighted. For example, each item of labeled training data may be associated with one weight value such that each weight value indicates each item's relative contribution to the output of the classification model. As an alternate example, each item of labeled training data may be associated with a plurality of weight values such that each feature of each item of labeled training data has an indicated relative contribution to the output of the classification model.

In the example of FIG. 4, labeled training data 420 and unlabeled input 430 comprise data points in a feature space. As mentioned above, aspects of the invention can be used with any type of data points in any type of feature space. In one non-limiting example, classification model 410 has been trained for the task of classifying the output of an automatic speech recognition (ASR) system. An ASR system may analyze speech and produce a list of possible sounds, words or phrases along with a score which represents the probability of each sound, word or phrase being correct. The feature space associated with ASR output may comprise ten or more features, non-limiting examples of which may include utterance length, the fraction of speech determined to be silence, the relative magnitude of the scores obtained by the ASR when applying a language model and when not applying a language model, and the relative magnitude of the highest and second highest scores output by the ASR. These are merely examples, as aspects of the invention can be used to classify the output of ASR systems that provide any number of features of any type. In addition, aspects of the invention are not limited to use with classifying the output of an ASR system, and can be used to classify data points of any type having any suitable features.

In the example of FIG. 4, labeled training data 420 and unlabeled input 430 are used to calculate new weight values for the labeled training data in act 440 so that the reweighted labeled training data more closely approximates the unlabeled input. In some embodiments, the new weight values are calculated by treating the labeled training data as being generated by multiple sources. For example, the labeled training data may be treated as being generated by one source that produces items of labeled training data that are more similar to the unlabeled input 430, and a second source that produces items of labeled training data that are less similar to the unlabeled input. Any suitable technique may be used to determine similarity. In one non-limiting example, regions of the feature space occupied by the labeled training data and the unlabeled test data are identified, and the distances between these regions of the feature space are used to indicate a measure of similarity between the labeled training data and items in the unlabeled test data.

In one illustrative embodiment described below, the labeled training data (referred to as the training feature space) is treated as having been generated by two sources, wherein one source generates a feature space that comprises both the labeled training data and the unlabeled input, and the other source generates regions of the feature space that are unique to the training data (i.e., that do not correspond to data in the unlabeled test data).

In the example discussed below, the underlying feature distribution of the labeled training data and the unlabeled test data are each modeled as being generated by a Gaussian Mixture Model (GMM). Each GMM comprises a plurality of Gaussian components, each of which has an associated probability of generating a data point (also called a mixture weight) of the data generated by the GMM. Each Gaussian component comprises a Gaussian distribution which is a statistical model of where in the feature space a data point will be located when it is generated by the Gaussian component. The method of determining the parameters of the Gaussian components in the example discussed below is the Expectation Maximization (EM) algorithm.

It should be appreciated that modeling the underlying feature distribution of the labeled training data and the unlabeled test data as each being generated by a GMM and determining the parameters of each GMM using the EM algorithm is provided as one example approach, and that aspects of the invention are not limited to use with this particular approach. Modeling the labeled training data as having been generated by two sources, wherein one source generates a feature space that comprises both the labeled training data and the unlabeled input, and the other source generates regions of the feature space that are unique to the training data, may utilize any suitable approach to model the two sources of data. The approach may, for example, utilize other distribution-based clustering models, centroid-based clustering or density-based clustering models, each of which may be combined with any suitable method for determining the parameters of the cluster model. In addition, a single GMM may also be used to model both the labeled training data and unlabeled test data, as aspects of the invention are not limited to using two GMMs to model the labeled training data and unlabeled test data.

As a non-limiting example of modeling the data using two GMMs, the labeled training data is modeled as being generated by a first GMM comprising nine Gaussian components, and the unlabeled input is modeled as being generated by a second GMM comprising four Gaussian components. Analysis of the modeled GMMs, the process of which is described in more detail below, may show a subset (e.g., six) of the nine Gaussian components generated by the first GMM as having some measure of similarity to the four Gaussian components generated by the second GMM that is greater than the measure of similarity between the remaining (e.g., three) Gaussian components generated by the first GMM and the four Gaussian components generated by the second GMM. Consequently, the subset of six Gaussian components within the first GMM and the four Gaussian components within the second GMM are collectively identified as modeling a source responsible for regions of the feature space that comprise both labeled training data and unlabeled input. The remaining three Gaussian components within the first GMM that were determined to be less similar to the unlabeled data are identified as modeling a source responsible for regions of the feature space that comprise training data alone.

The above example is provided to illustrate the use of two GMMs to model labeled training data and unlabeled test data, but aspects of the invention are not limited to the particular number of GMMs or Gaussian components described above, nor are aspects of the invention limited to a particular number of Gaussian components selected to be more similar to the unlabeled input. Determining a measure of similarity between Gaussian components used to model the labeled training data and Gaussian components used to model the unlabeled test data may be performed in any suitable way based on the determined parameters of the Gaussian components.

Below is described an example of modeling the labeled training data and unlabeled test data wherein it is assumed that the labeled training data (i.e., the training feature space) is generated by two sources, wherein one source $s_1$ generates a feature space that comprises both the labeled training data and the unlabeled input, and the other source $s_2$ generates regions of the feature space that are unique to the training data.

Where x is a feature vector and y is a class label, a classifier may be associated with each of the two sources $s_1$ and $s_2$ as follows:

$$p(y|x,s_i), i=1,2 \qquad \text{(Equation 1)}$$

Equation 1 expresses the probability p of an item of training data or test data having a class label y where the item of training data or test data has a feature vector x and was provided by source $s_i$. From this the labeled training data distribution may be written as:

$$p_D(x, y) = \sum_s p(x, y, s) = \sum_s p(y|x, s)p(x|s)p(s) \qquad \text{(Equation 2)}$$

where D denotes the labeled training data and $p_D(x, y)$ represents the probability of a data point in the labeled training data having a feature vector x and a class label y.

In this example embodiment, the underlying feature distribution of the labeled training data and unlabeled test data are each treated as being generated by a Gaussian Mixture Model (GMM). When the training data GMM is treated as being comprised of two sources, the labeled training data distribution may be modeled as:

$$p_D(x) = p(s_1)\sum_{k=1}^{M_1} \alpha_{1k}^D p_{1k}(x) + p(s_2)\sum_{k=1}^{M_2} \alpha_{2k}^D p_{2k}(x) \qquad \text{(Equation 3)}$$

where $s_1$ is the source 1 responsible for regions of the feature space that comprise labeled training data and unlabeled input, $s_2$ is the source 2 responsible for regions of the feature space that comprise training data alone, $M_1$ and $M_2$ are the number of Gaussian components used to model the contributions of source 1 and source 2, respectively, to the labeled training data, k is the index of summation of each of the two sums, $\alpha_{1k}^D$ and $\alpha_{2k}^D$ are mixture weights of the Gaussian components, $p_{1k}(x)$ and $p_{2k}(x)$ are Gaussian densities of the Gaussian components, and this distribution is generated from $p(s_1)$ and $p(s_2)$ proportions of source 1 and source 2 respectively. A Gaussian density is a Gaussian function parameterized by a mean $\mu$ and a covariance $\Sigma$.

The GMMs of the present example are diagonal, although aspects of the present invention are not limited to the use of diagonal GMMs, and GMMs with off-diagonal elements may also be used.

As with the approach used to model the labeled training data distribution in Equation 3 above, the unlabeled input distribution (i.e., test data) may be modeled by a test data GMM written as follows:

$$p_T(x) = \sum_{k=1}^{M_1} \alpha_{1k}^T p_{1k}(x) \quad \text{(Equation 4)}$$

where T denotes the unlabeled test data, $M_1$ is the number of Gaussian components used to model the contribution of source 1 to the unlabeled test data, $p_T(x)$ represents the probability of a data point in the unlabeled test data having a feature vector x, $\alpha_{1k}^T$ are mixture weights of the Gaussian components, $p_{1k}(x)$ are Gaussian densities of the Gaussian components. In this example, the number of Gaussian components used to model the test data, $M_1$, in the test data GMM is the same as the number of Gaussian components used to model the data generated by source 1 in the training data GMM, though aspects of this invention are not limited in this way and any number of Gaussian components may be used in each GMM and for each source.

The above example is provided as a non-limiting illustrative example of modeling labeled training data and unlabeled test data as being generated by two sources, and any other suitable approach for modeling the labeled training data and unlabeled test data as being generated by two sources may be used, another example of which includes density-based clustering models, such as the DBSCAN method. The above example provides a parametric model of the two sources, the parameters of which may be determined via any suitable method. However, this is merely a non-limiting example, as any suitable parameterization of two sources may be used, wherein one source generates a feature space that comprises both the labeled training data and the unlabeled input, and the other source generates regions of the feature space that are unique to the training data.

As mentioned above, the Expectation Maximization algorithm may be used to determine the parameters of the Gaussian components of the two GMMs (shown in Equations 3 and 4) used to model the labeled training data and the unlabeled input, wherein the labeled training data and the unlabeled input are generated by two sources where one source generates a feature space that comprises both the labeled training data and the unlabeled input, and the other source generates regions of the feature space that are unique to the training data. However, aspects of the invention are not limited to use with the Expectation Maximization (EM) algorithm, as any suitable approach may be used to determine the parameters of the above-described parametric model used to model the data.

In the below example, the training data points are represented as $u \in D$ and the unlabeled input data points are represented as $\upsilon \in T$. Using this notation we may write the joint distribution, which represents the probability that the two GMMs being used to model the training data and the test data match the actual combined training and test data, given the parameters of both GMMs and the classifier's parameters. The joint distribution can be written as:

$$P((x^u, y^u | u \in D), (x^\upsilon | \upsilon \in T) | \Theta, w) \quad \text{(Equation 5)}$$

where $\Theta$ represents the set of parameters associated with the underlying Gaussian components of the two GMMs used to model the training data and the test data (i.e., the mixture weights and Gaussian densities of the Gaussian components as shown in Equations 3 and 4, and the mean and covariance of each Gaussian component), and w are parameters which describe the function being used to model the classifier $p(y^u | x^u)$ (i.e., parameters which parameterize the classifier used to determine the probability of a class for a given data point, which include weight values).

The EM algorithm iterates through two steps, known as the 'E step' and the 'M step'. In the E step, the log likelihood of the observed training and test data is calculated for given values of $\Theta$ and w. The log likelihood is simply a different form of the joint distribution given by Equation 5 and consequently also represents the probability that the model matches the combined training and test data for given values of the GMM parameters $\Theta$ and classifier parameters w. In the M step, the GMM parameters are adjusted in order to maximize the log likelihood calculated in the E step. The E step is then performed again, then the M step, and so on until the log likelihood converges. At this stage the maximally likely GMM parameters and classifier parameters have been determined.

As a non-limiting example of applying the EM algorithm to determine the maximally likely GMM parameters, Equations (1) through (5) can be used to determine the log likelihood of the observed training and test data. As described above, the log likelihood of the observed training and test data represents the probability that the model matches the combined training and test data for given values of the GMM parameters $\Theta$ and classifier parameters w:

$$\log P((x^u, y^u | u \in D), (x^\upsilon | \upsilon \in T) | \Theta, w) = \quad \text{(Equation 6)}$$
$$\sum_{u \in D} \log \left( \sum_j p(s_j) \sum_{k=1}^{M_j} \alpha_{jk}^D p_{jk}(x^u | \theta_{jk}) p_j(y^u | x^u, w_j) \right) +$$
$$\sum_{\upsilon \in T} \log \left( \sum_{k=1}^{M_1} \alpha_{1k}^T p_{1k}(x^\upsilon | \theta_{1k}) \right)$$

As described above, the parameters $(\Theta, w)$ may be estimated via the EM algorithm in a number of iterations. The E step of the EM algorithm for iteration t results in computation of the posterior probability $P(s, k | x^u, y^u, \Theta^t, w^t)$ for a given labeled training data point $x^u$, where s is one of the two sources $s_1$ and $s_2$, and k is the index of one of the Gaussian components of the Gaussian Mixture Model:

$$\gamma_{sk}^u = \frac{p(x^u, y^u | s, k, \Theta^t, w^t) p(k | s) p(s)}{\sum_{\hat{s}, \hat{k}} p(x^u, y^u | \hat{s}, \hat{k}, \Theta^t, w^t) p(\hat{k} | \hat{s}) p(\hat{s})} \quad \text{(Equation 7)}$$

-continued $$= \frac{p(x^u \mid s, k, \Theta^t) p(y^u \mid x^u, w_s^t) \alpha_{sk}^D p_s}{\sum_{\hat{s},\hat{k}} p(x^u \mid \hat{s}, \hat{k}, \Theta^t) p(y^u \mid x^u, w_{\hat{s}}^t) \alpha_{\hat{s}\hat{k}}^D p_{\hat{s}}}$$

The posterior probability in Equation 7 expresses the probability that a particular labeled training data point u was generated by source s given the data point's feature vector $x^u$ and the parameters $(\Theta, w)$ associated with the Gaussian component k in the training data GMM and the classifier parameters.

The posterior probability that a particular test data point $\upsilon$ was generated by source 1 given the data point's feature vector $x^\upsilon$ and the parameters $\Theta$ associated with the Gaussian component k in the test data GMM can be calculated to be:

$$\gamma_{1k}^v = P(s_1, k \mid x^v, \Theta_t) \quad \text{(Equation 8)}$$

$$= \frac{p(x^v \mid s_1, k, \Theta^t) \alpha_{1k}^T}{\sum_k p(x^v \mid s_1, \hat{k}, \Theta^t) \alpha_{1\hat{k}}^T}$$

Accordingly, the posterior probabilities expressed in Equation 7 provide an indication for the training data of the probability that a particular training data point is from source 1 or source 2 for a particular set of GMM parameters and the classifier parameters. The posterior probabilities expressed in Equation 8 provide an indication for the test data of the probability that a particular test data point is from source 1 for a particular set of GMM parameters. The maximization step (M-step) of the EM algorithm can be used to determine the parameters of the Gaussian Mixture Model used to model the training data and test data.

The M step provides for a calculation of the proportions of source 1 and source 2 that generate the training data, as described above in relation to Equation 3. This is calculated to be:

$$p(s_s) = \frac{1}{N^D} \sum_{i=1}^{N^D} \sum_{k=1}^{M_s} \gamma_{sk}^{u_i} \quad \text{(Equation 9)}$$

where $N^D$ is the number of labeled training data points, and $M_s = M_1, M_2$.

The mixture weights, also described above in relation to Equation 3, are calculated to be:

$$\alpha_{sk}^D = \frac{1}{p(s_s) N^D} \sum_{i=1}^{N^D} \gamma_{sk}^{u_i}, \quad \text{(Equation 10)}$$

$$\alpha_{1k}^T = \frac{1}{N^T} \sum_{i=1}^{N^T} \gamma_{1k}^{v_i},$$

where $N^T$ is the number of unlabeled test data points and $\gamma_{sk}^u$ and $\gamma_{1k}^\upsilon$ are the posteriors in Equation 7 and Equation 8 respectively.

The M step further provides for a calculation of the mean $\mu$ and covariance $\Sigma$ for each of the Gaussian components, wherein the first index of the mean or covariance denotes the training data GMM as 1 and the test data GMM as 2 (e.g., $\mu_{1,k}$ is the mean of Gaussian component k in the training data GMM):

$$\mu_{1,k} = \frac{\sum_{i=1}^{N^D} \gamma_{1k}^{u_i} x^{u_i} + \sum_{i=1}^{N^T} \gamma_{1k}^{v_i} x^{v_i}}{T_A} \quad \text{(Equation 11)}$$

$$\Sigma_{1,k} = \frac{\sum_{i=1}^{N^D} \gamma_{1k}^{u_i} \xi_{1,k}^{u_i} (\xi_{1,k}^{u_i})^T + \sum_{i=1}^{N^T} \gamma_{1k}^{v_i} \xi_{1,k}^{v_i} (\xi_{1,k}^{v_i})^T}{T_A} \quad \text{(Equation 12)}$$

$$\mu_{2,k} = \frac{\sum_{i=1}^{N^D} \gamma_{2k}^{u_i} x^{u_i}}{\sum_{i=1}^{N^D} \gamma_{2k}^{u_i}} \quad \text{(Equation 13)}$$

$$\Sigma_{2,k} = \frac{\sum_{i=1}^{N^D} \gamma_{2k}^{u_i} \xi_{2,k}^{u_i} (\xi_{2,k}^{u_i})^T}{\sum_{i=1}^{N^D} \gamma_{2k}^{u_i}} \quad \text{(Equation 14)}$$

where $$T_A = \sum_{i=1}^{N^D} \gamma_{1k}^{u_i} + \sum_{i=1}^{N^T} \gamma_{1k}^{v_i},$$

and $$\xi_{j,k}^u = (x^u - \mu_{j,k}).$$

The classifier is updated in each M step. In the present example, the classifier may be any suitable type of classifier used to model $p(y^u | x^u)$ and is parameterized by parameters w. Independently of the form of the classifier, parameters w may be updated using the following equation:

$$w_s^t = w_s^{t-1} + \epsilon H_s^{-1} g \quad \text{(Equation 15)}$$

where $w_s^t$ are the (new) values of parameters w for iteration t, $w_s^{t-1}$ are the (old) values of parameters w for iteration t−1, $\epsilon$ is a step size, and where the gradient g and the Hessian $H_s$ are given by:

$$g = \frac{\partial}{\partial w_s} \sum_{i=1}^{N^D} \left[ \sum_{k=1}^{M_s} \gamma_{sk}^u \right] \log(p(y_i^u \mid x_i^u, w_s))$$

$$H_s = \frac{\partial^2}{\partial w_s^2} \sum_{i=1}^{N^D} \left[ \sum_{k=1}^{M_s} \gamma_{sk}^u \right] \log(p(y_i^u \mid x_i^u, w_s))$$

Once the parameters of the model are determined, the training data GMM can be compared with the test data GMM to identify the Gaussian components that, in the model, generate both training data and test data. Determining which of the Gaussian components of the training data GMM are identified as contributing to which of the two sources is described in further detail below in relation to FIG. 5.

As described above, improvement of the performance of the classification model for a distribution of test data may be achieved by calculating new weight values, so that in some embodiments, reweighting of the labeled training data is performed. Reweighting of the labeled training data may be performed in any suitable way, such as by basing new weight values on the calculated posterior probabilities shown in Equations 7 and 8. As one non-limiting example of this approach, labeled training data items for which the source 1 posterior probability is higher than the source 2 posterior probability are reweighted to provide a greater contribution to the output of the classification model, and labeled training data for which the source 2 posterior probability is higher than the source 1 posterior probability are reweighted to provide a smaller (including possibly no) contribution to the output of the classification model.

Application of a new set of weights for the labeled training data may be implemented in any suitable manner. For example, only a subset of the labeled training data may be reweighted such that part of the data set is unchanged by the reweighting, or a complete recalculation of all weights associated with the labeled training data may be performed.

Below is described an example of one technique for determining new weight values based upon the above-described illustrative example of using a GMM to model the data as being generated by two sources. This example is non-limiting, as the new weight values of a classification model can be determined in other ways, and other techniques may be used when the input is not modeled as a GMM comprising two sources.

In one illustrative embodiment, the classifier p(y|x) is modeled using a Gaussian Mixture Model classifier. This is a different GMM than the 'feature generation GMMs' that were used to model the training data and test data distributions, as described above. However, any suitable classifier model may be used, other examples of which include logistic regression or a mixed exponential model. In the illustrative embodiment described below, the classifier is a binary classifier, but the classifier is not limited to binary classification, as the techniques described herein may be used with a multiclass classifier configured to classify any number of classes.

In one illustrative embodiment, new weight values are calculated by determining weight values that will maximize the log likelihood shown in Equation 6. The log likelihood represents the probability that the model matches the observed training and test data, and accordingly, new weight values calculated to maximize the log likelihood will thereby improve performance of the model when classifying the training and test data. This may be beneficial to improve results that are provided by the classification model on the training and test data.

An example of one technique for maximizing the log likelihood of Equation 6 is to formulate a loss function that indicates a measure of loss when classifying a data point with an incorrect class label. This loss function may be minimized as a proxy for maximizing the log likelihood. This is provided as merely one example technique, as any suitable approach, including maximizing the log likelihood directly, may be used.

A loss function for a binary classifier may written as:

$$L_c(x) = \frac{1}{1 + \exp\left(\eta\left(\log\frac{p(x|H_c)}{p(x|H_{ic})}\right)\right)} \quad \text{(Equation 16)}$$

where $\eta$ is a smoothed step function, the correct class label is $H_c$ and the incorrect class label is $H_{ic}$. The value of $L_c(x)$ is either 0 or 1, representing either a case where the classifier determined the correct class label to a feature vector x (no loss), or a case where the classifier determined the incorrect class label to the feature vector x (loss).

The total weighted loss function for all feature vectors may be determined for labeled training data $((x_i, y_i): i=1, \ldots, N)$, binary classes $y_i \in (H_1, H_2)$ and weights given by Equation 6, as:

$$\Gamma_S = \sum_{i=1}^{N} \sum_{j=1}^{2} \left[\sum_{k=1}^{M_S} \gamma_{sk}^{u_i}\right] L_j(x_i) I(x_i \in H_j) \quad \text{(Equation 17)}$$

where I( ) is an indicator function that is equal to 1 when the feature vector $x_i$ is assigned class label $H_j$ by the classifier, and 0 otherwise, and wherein $L_j(x_i)$ is given by Equation 16. The function $\Gamma_S$ represents the total weighted loss over all the Gaussian components of the GMM model for the training data, and weights each loss value $L_j(x_i)$ by the posterior $\gamma_{sk}^{u_i}$. The posterior weighting is added so that feature vectors which provide a greater contribution to the output of the classification model provide a greater output to the total weighted loss function. For example, a feature vector with a small posterior value provides a small contribution to the output of the classification model, and consequently the loss from misclassifying this feature vector is weighted to be smaller than for a feature vector with a larger posterior value. The above examples are merely illustrative, as aspects of the invention are not limited to the particular form of the loss function provided in Equation 16, as any suitable form of loss function can be used.

To determine new weight values that will reweight the training data to reflect the distribution of test data, as described above, the loss function is minimized with respect to the classifier parameters w. This results in weighted gradients of the loss function for the correct and incorrect class for sample x as:

$$\frac{\partial L_c(x)}{\partial w_c} = -\left[\sum_{k=1}^{M_S} \gamma_{sk}^{u}\right] \eta L_c(1 - L_c) \frac{\partial \log p(x|H_c)}{\partial w_c} \quad \text{(Equation 18)}$$

$$\frac{\partial L_c(x)}{\partial w_{ic}} = \left[\sum_{k=1}^{M_S} \gamma_{sk}^{u}\right] \eta L_c(1 - L_c) \frac{\partial \log p(x|H_{ic})}{\partial w_{ic}} \quad \text{(Equation 19)}$$

where the classifier parameters are represented by parameters $w_c$ and $w_{ic}$ for the correct and incorrect classes, respectively, which are implicitly tied to the class labels $H_c$ and $H_{ic}$ respectively.

The classifier parameters w that minimize Equations 18 and 19 indicate new weight values that may be used when updating the classifier to improve performance of the classification model on unlabeled input. The classifier parameters may be determined from Equations 18 and 19 via any suitable method. For example, the classifier parameters may be determined via Newton's method, the conjugate gradient method, or in any other suitable way. A classifier utilizing the new weights may be incorporated into the classification model to provide a reweighted classification model. The reweighting may be performed in any suitable way.

The above non-limiting example of calculating new weight values for the labeled training data so that it approximates the unlabeled test data to optimize the performance of a classification model may be applied in any suitable manner, and is not limited to being based upon the above-described illustrative example of using two GMMs that model the labeled training data and unlabeled test data as being generated by two sources, nor is the above-described example limited to calculating new weight values using a binary GMM classifier.

Returning to the example of FIG. 4, as described above, new weight values are determined in act 400. Having determined new weight values for the labeled training data in act 440, the new weight values are associated with the labeled training data in act 450 to produce reweighted labeled training data that approximates the unlabeled test data. Reweighting of the labeled training data may be performed in any suitable manner. As one non-limiting example, the labeled training data may be reweighted by setting a weight value associated with each item of labeled training data to a new weight value based on the result of act 440.

In act 460, the reweighted labeled training data is used to retrain classification model 410, thereby improving the performance of the classification model 410 for the distribution of unlabeled input 430. In one embodiment, retraining comprises using the classification model 410 and performing further training using the reweighted labeled training data 450 to further shape the way that the classification model responds to the unlabeled input, although other retraining techniques may be used. However, this is merely one example, as the retraining process may be performed in any suitable way. In one non-limiting example, the same process is followed as was used to create the classification model 410, and the labeled training data 420 with the new weight values determined in act 440 is used to create a new classification model. Thus, as used herein, the process of retraining the classification model can include adapting the existing classification model based on additional training data (e.g., the reweighted labeled training data determined in act 450) or creating a new classification model directly from the reweighted training data.

The above therefore describes the improving of the performance of a classification model on a distribution of test data by calculating new weight values so that the reweighted labeled training data better represents the unlabeled test data, and the retraining of the classification model using the reweighted labeled training data.

Figure 5:
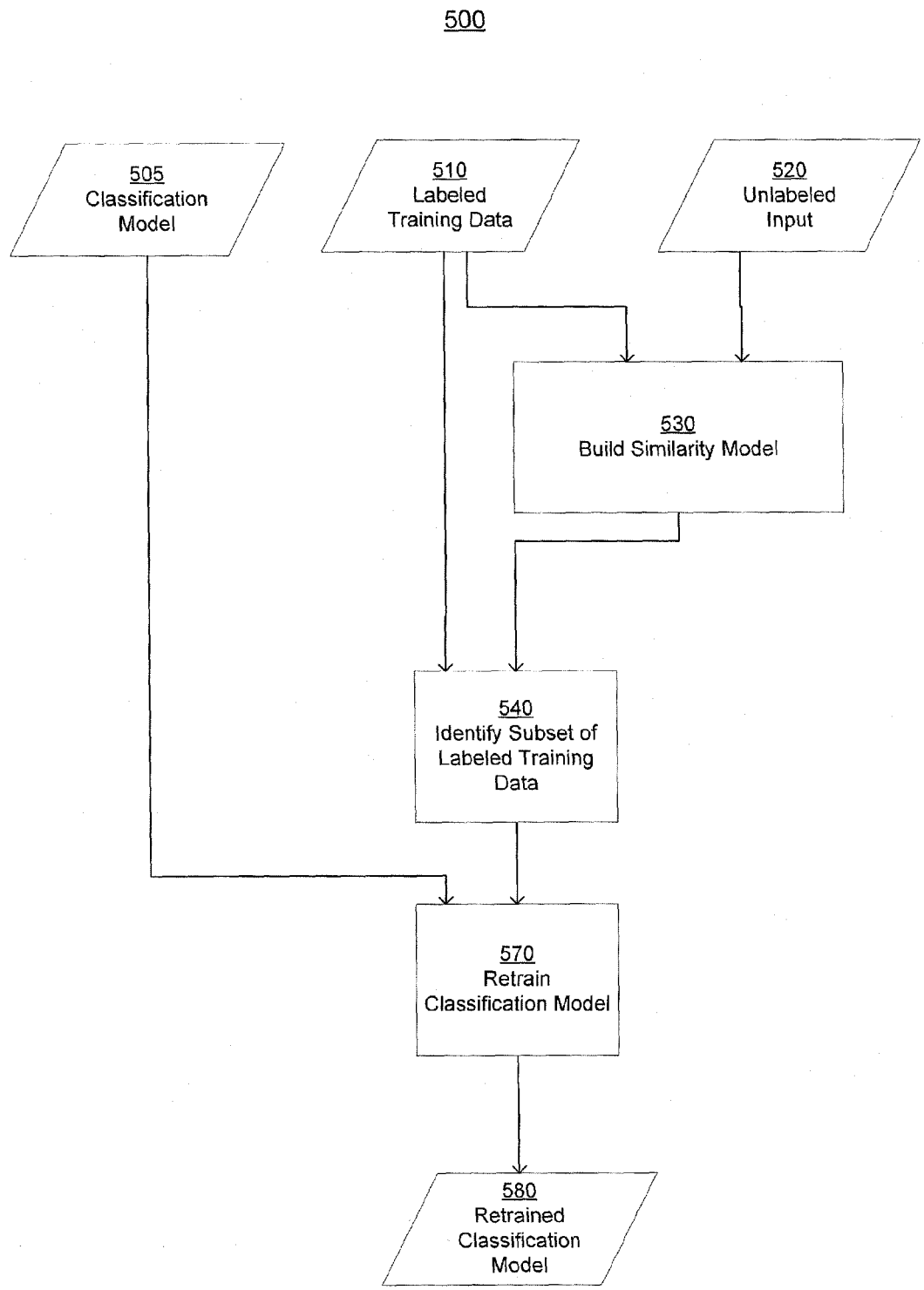
FIG. 5 is a flow chart of an exemplary method that builds a retrained classification model based on a similarity model of labeled training data and unlabeled input, in accordance with some embodiments of the present invention.

In one embodiment, the improving of a classification model is based on a similarity model of the type described above generated from labeled training data and unlabeled test data. FIG. 5 depicts an alternative technique to that described by FIG. 4 to generate an improved classification model.

The method 500 shown in FIG. 5 provides an exemplary technique that may be used to generate an improved classification model for performing classification of a distribution of test data. FIG. 5 depicts a flow chart of exemplary method 500 that builds a classification model for an environment having a distribution of test data based on a similarity model comparing the unlabeled test data with labeled training data. However, in contrast to FIG. 4, the method of FIG. 5 uses the similarity model to select a subset of the labeled training data that is more similar to the unlabeled input than the remainder of the labeled training data, and then performs retraining of the classification model using the subset of labeled training data (wherein the method of FIG. 4 reweights all of the labeled training data and uses the reweighted labeled training data to perform retraining of the classification model).

The inputs to method 500 are classification model 505, labeled training data 510 and unlabeled input 520. The output from method 500 is a classification model 580 designed to classify items of unlabeled input data into one of a plurality of classes, with the expectation that the model will perform better on the distribution of unlabeled test data than the model built solely from the original labeled training data using conventional techniques. As discussed above, labeled training data 510 and unlabeled input 520 comprise data points in a feature space. Labeled training data 520 may have a set of weights that may be used to specify the relative contribution of each item of labeled training data to the training corpus. Classification model 505 was trained using labeled training data 520.

In act 530, a similarity model is built using the labeled training data 510 and unlabeled input 520. The similarity model may be any mathematical model or algorithm used to measure similarity between the labeled training data and unlabeled input. As one non-limiting example, the similarity model may be formed using a clustering technique, and may be, for example, a distributional clustering model or a nearest-neighbor averaging model, but other types of similarity models may be used. A similarity model may be used to provide a measure of similarity between two groups of data. Such a measure of similarity may be expressed in any suitable manner. As one example, it may be expressed as the probability of a given data point being part of a particular source distribution modeled responsible for generating a subset of the data set.

As discussed above, the similarity model may be based on an assumption that the labeled training data is comprised of two sources, wherein one source is responsible for regions of the feature space that comprise labeled training data and unlabeled input, and the other source is responsible for regions of the feature space that comprise only labeled training data alone.

Also as described above, in one non-limiting example, the similarity model may be based on an assumption that the underlying feature distribution of the labeled training data and the unlabeled test data are each modeled as being generated by a Gaussian Mixture Model (GMM), and the similarity model may be based on posterior probabilities that provide an indication of similarity by expressing the probability that a given data point is from the source responsible for regions of the feature space that comprise labeled training data and unlabeled input, or from the source responsible for regions of the feature space that comprise training data alone. By using a cutoff probability value to separate the data points into two groups, the posterior probabilities may allow the identification of labeled training data that are more similar to unlabeled input than the remainder of labeled training data. Such a cutoff probability value may be determined in any suitable way, e.g., based on user input, or a computing device applying a heuristic based on desired performance characteristics of the classification model, or in any other suitable way.

As one non-limiting example of generating a similarity model, the labeled training data may be modeled as being generated by a first GMM comprising a plurality of Gaussian components, and the unlabeled input may be modeled as being generated by a second GMM comprising a plurality of Gaussian components. Determination of the parameters describing the GMMs (e.g., via the EM algorithm methods described above, or in any other suitable way) may be used to indicate a measure of similarity between each pair of Gaussian components. Any suitable metric may be used to measure similarity based on the calculated Gaussian components. As one example, the distances in the feature space between the center of each Gaussian component associated with the first GMM and the center of each Gaussian component associated with the second GMM may be calculated as the metric of similarity between pairs of Gaussian components. One or more Gaussian components associated with the first GMM that have the smallest calculated distances to any one of the Gaussian components associated with the second GMM may accordingly be chosen as being components of the training data that are more similar to the test data than the remaining Gaussian components associated with the first GMM. However, this is provided merely as an example, as any suitable metric for determining which portions of the training data are more similar to the test data may be used.

The subset of the labeled training data identified in act 540 as more similar to unlabeled input than the remainder of the labeled training data is used in act 570 to train classification model 580. The training of classification model 580 may be performed in any suitable manner, examples of which are described above.

The above therefore describes the improving of the performance of a classification model on a distribution of test data by selecting a subset of the training data and retraining the classification model using the subset of the training data so that the data used to train the classification model better represents the unlabeled test data.

In one embodiment, the improving of a classification model is based on a similarity model of the type described above generated from labeled training data and unlabeled test data, and comprises the identification and labeling of items of unlabeled test data that differ the most from the labeled training data.

Figure 6:
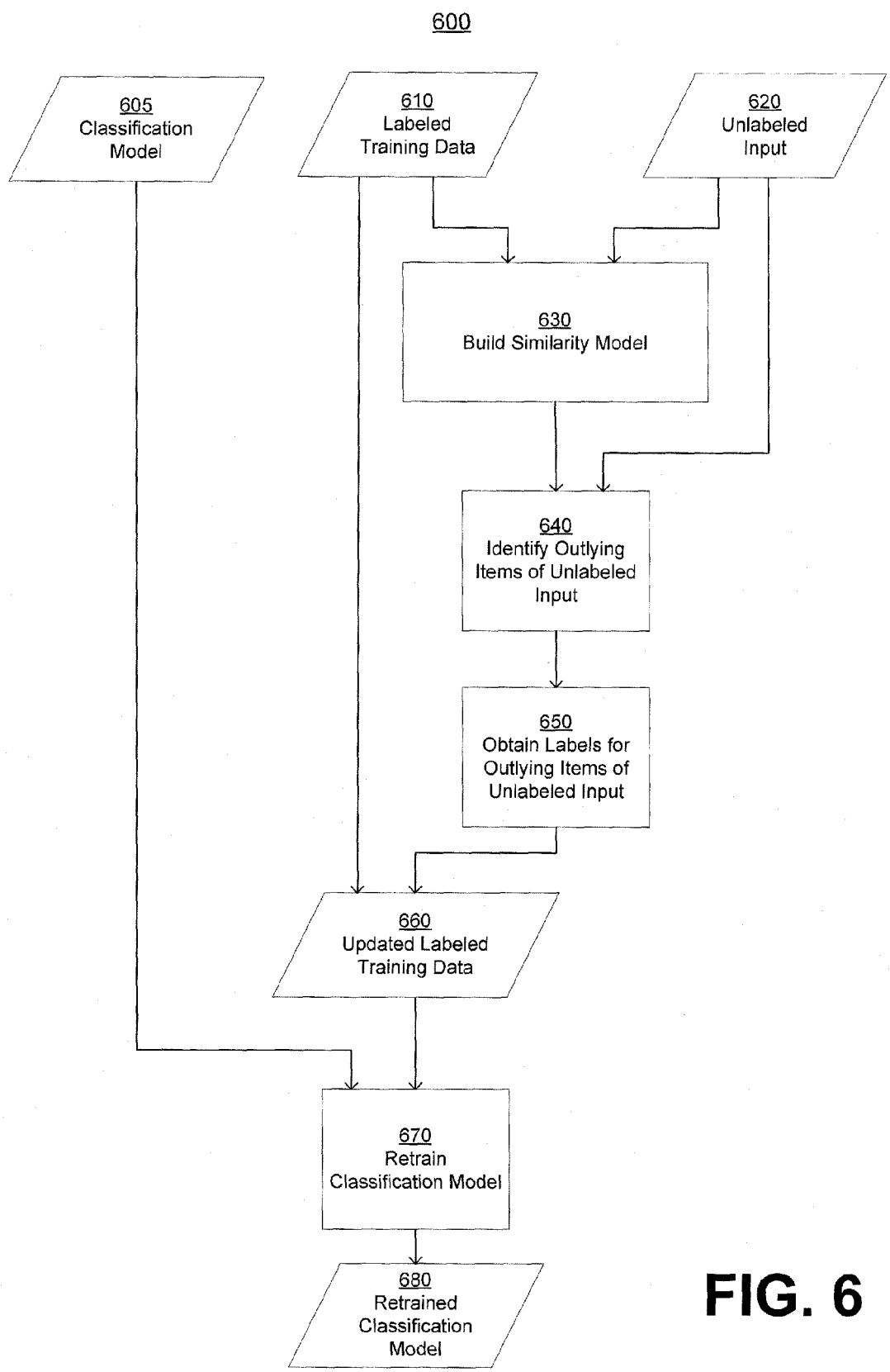
FIG. 6 is a flow chart of an second exemplary method that builds a retrained classification model based on a similarity model of labeled training data and unlabeled input, in accordance with some embodiments of the present invention.

FIG. 6 depicts an alternative technique to that described by FIGS. 4 and 5 to generate an improved classification model. The method 600 shown in FIG. 6 provides an exemplary technique that may be used to generate an improved classification model for performing classification of a distribution of test data. FIG. 6 depicts a flow chart of exemplary method 600 that builds a classification model for an environment having a distribution of test data based on a similarity model comparing the unlabeled test data with labeled training data. In contrast to FIGS. 4 and 5, the method of FIG. 6 uses the similarity model to identify items of unlabeled input data that have a low measure of similarity to the labeled training data than a remainder of the unlabeled input, to obtain labels for the identified items of unlabeled input, and to use the labeled identified items and the original labeled training data to train an improved classification model.

The inputs to method 600 are classification model 605, labeled training data 610 and unlabeled input 620. The output from method 600 is a classification model 680 designed to classify items of unlabeled input data into one of a plurality of classes, with the expectation that the model will perform better on the distribution of unlabeled test data than the model built solely from the labeled training data using conventional techniques. As discussed above, labeled training data 610 and unlabeled input 620 comprise data points in a feature space. Labeled training data 620 may have a set of weights that may be used to specify the relative contribution of each item of labeled training data to the training corpus. Classification model 605 was trained using labeled training data 620.

In act 630, a similarity model is built using the labeled training data 610 and unlabeled input 620. The similarity model may be built in any suitable way, as described above in relation to act 530 in FIG. 5.

In the example of FIG. 6, outlying items of unlabeled input are identified in act 640. Outlying items are items of unlabeled input that are less similar to the labeled training data than a remainder of the unlabeled input. In other words, outlying items are items of unlabeled input that differ the most from the labeled training data. A classification model trained on the labeled training data may therefore be expected to provide poorer performance when classifying outlying items of unlabeled input compared to the remainder of the unlabeled input, since the outlying items of unlabeled input are those least similar to the data used to train the classification model.

As one non-limiting example of the above described technique, outlying items may be identified by treating the data as having been generated by two sources, wherein one source generates a feature space that comprises both the labeled training data and the unlabeled input, and the other source generates regions of the feature space that are unique to the training data. In this example, outlying items of unlabeled input may be identified as items of unlabeled input determined to be less likely to be produced by the source responsible for regions of the feature space that comprise labeled training data and unlabeled input.

As discussed above, in one non-limiting example, a similarity model may be generated by modeling the two sources of data using a GMM to model each of the training and test data sets, as described above. Outlying items may thereby be identified as having lower values of the posterior probability in Equation 8. By using a cutoff value for the posterior probability in Equation 8, a set of outlying items may be identified. The value of such a cutoff value may be chosen in any suitable way. As one non-limiting example, the data points that produce the lowest 5% of the posterior values are chosen as outlying items.

In the example of FIG. 6, once outlying items of unlabeled input have been identified in act 640, labels are obtained for these outlying items in act 650. Labels may be obtained in any suitable way, such as by having a user provide labels for the outlying items via a user interface (UI). The resulting items of labeled test input may subsequently be used in retraining a classification model, since the labels would then be known and the addition of the items of labeled test input may improve the performance of the classification model when classifying unlabeled input.

In act 660, the items of labeled test input created in act 650 are combined with labeled training data 610 to create an updated set of labeled training data. This updated labeled training data is used in act 670 to train classification model 680. The training of classification model 680 may be performed in any suitable manner, examples of which are described above.

The above therefore describes the improving of the performance of a classification model on a distribution of test data by identifying items of unlabeled input that are most different from the labeled training data, by obtaining labels for the identified items, and retraining the classification model using the labeled identified items in addition to the labeled training data so that the resulting classification model provides improved performance on the unlabeled test data.

In one embodiment, the performance of a classification model on unlabeled input may be determined using the similarity model described above. The similarity model may be used to identify a subset of labeled training data that is more similar to the unlabeled input than a remainder of labeled training data. A classification model trained on the full set of labeled training data may be used to perform classification on this subset of labeled training data, thereby providing an indication of the performance of the classification model on the unlabeled input.

Figure 7:
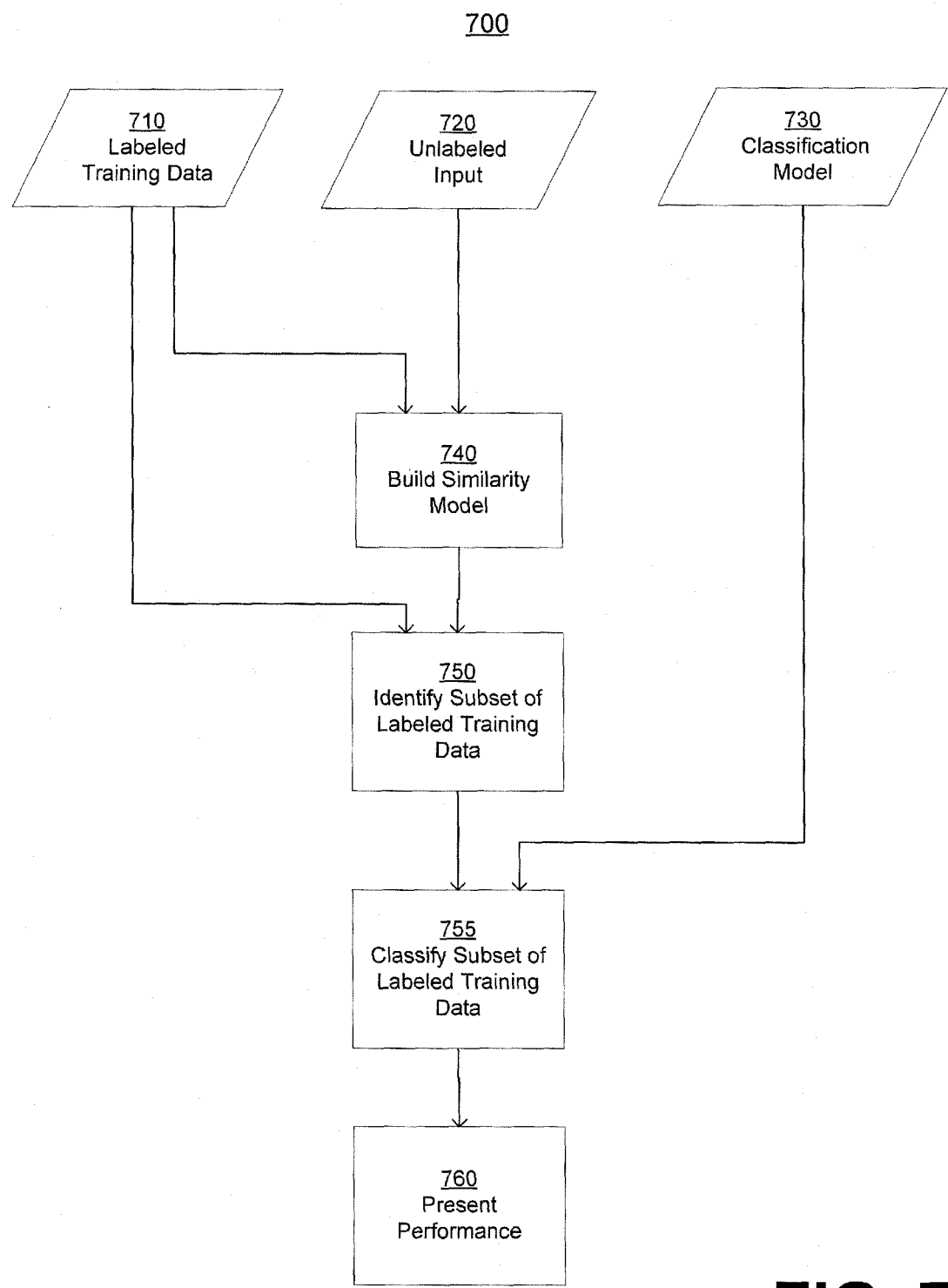
FIG. 7 is a flow chart of an exemplary method that determines and presents the performance of a classification model on unlabeled input, in accordance with some embodiments of the present invention.

FIG. 7 depicts a flow chart of exemplary method 700 that determines the performance of a classification model on unlabeled input. The inputs to method 700 are labeled training data 710, unlabeled input 720 and classification model 730 trained using labeled training data 710 and designed to classify items of labeled training data and unlabeled input data into one of a plurality of classes. The output from method 700 is information indicating the performance of classification model 730 on unlabeled input 720, to be described further below.

In act 740, labeled training data 710 and unlabeled input 720 are used to build a similarity model. The similarity model may be built in any suitable way, examples of which are described above in relation to FIG. 5. In act 750, the similarity model is used to identify a subset of the labeled training data that is more similar to unlabeled input than the remainder of the labeled training data. Act 750 may be performed in any suitable way, examples of which are described above in relation to FIG. 5.

In act 755, the classification model 730 is used to perform classification on the subset of labeled training data identified in act 750, and in act 760 the performance of the classification model on the subset of labeled training data is presented. As described above, this performance measure provides an indication of the performance of the classification model 730 on the unlabeled input data 720.

The results of the classification performed in act 760 may be presented in any suitable way, as embodiments that relate to presenting the results are no limited to any particular presentation technique. In one example, the results of classifying the subset of labeled training data identified with the classification model are presented to a user via a graphical user interface (GUI). One example of such a GUI will be described below in relation to FIG. 9. However, this is provided merely as an example technique, as the results of using the classification model 730 to classify the subset of labeled training data may be output in any form (e.g., as text or as one or more computer data files, etc.).

The results presented in act 760 comprise information relating to the performance of the classification model 730 in classifying the subset of labeled training data. As non-limiting examples of the content of the results that may be presented, when the classification model is a binary classification model, the results may comprise one or any combination of: a measure (e.g., a percentage of any other measure) of Class I data points correctly identified as Class I data points; a measure of Class II data points correctly identified as Class II data points; a measure of Class I data points misidentified as Class II data points; and a measure of Class II data points misidentified as Class I data points. In some embodiments, the results may also or alternatively comprise statistics provided in the form of a measure of the sensitivity and/or specificity of the classification model for the two classes. However, these examples are merely illustrative, as any type of statistical data describing the performance of the classification model may be provided in any form. In addition, the results presented are not limited to results of a binary classification model, and could also be presented in any suitable way for a multiclass classification model.

As a further non-limiting example of presenting the results in act 760 as a measure of data points correctly or incorrectly classified, the results may comprise values describing a receiver operating characteristic (ROC) curve, or a detection error tradeoff (DET) curve. When the labeled training data is associated with an accept class and a reject class, an ROC curve may be determined based on the rate of incorrectly classifying a reject data point as an accept data point ('false accept') and the rate of correctly classifying an accept data point as an accept data point ('true accept'). Similarly, a DET curve may be determined based on the rate of incorrectly classifying a reject data point as an accept data point ('false accept') and the rate of incorrectly classifying an accept data point as a reject data point ('false reject'). However, aspects of the present invention described herein are not limited in this respect, as any method of presenting the performance of a classification model to a user may be used.

In one embodiment, optimization of a classification model is performed by generating a similarity model of labeled training data and unlabeled input (using any of the techniques described above) and by transforming the feature space of the labeled training data based on the similarity model to yield improved performance of the classification model on the unlabeled input. By understanding similarities between the labeled training data and unlabeled input, the labeled training data can be transformed to be more similar to the unlabeled input. Accordingly, a classification model trained on the transformed training data would be expected to yield improved performance in at least one respect when classifying the unlabeled input compared with a classification model training on the original labeled training data.

Figure 8:
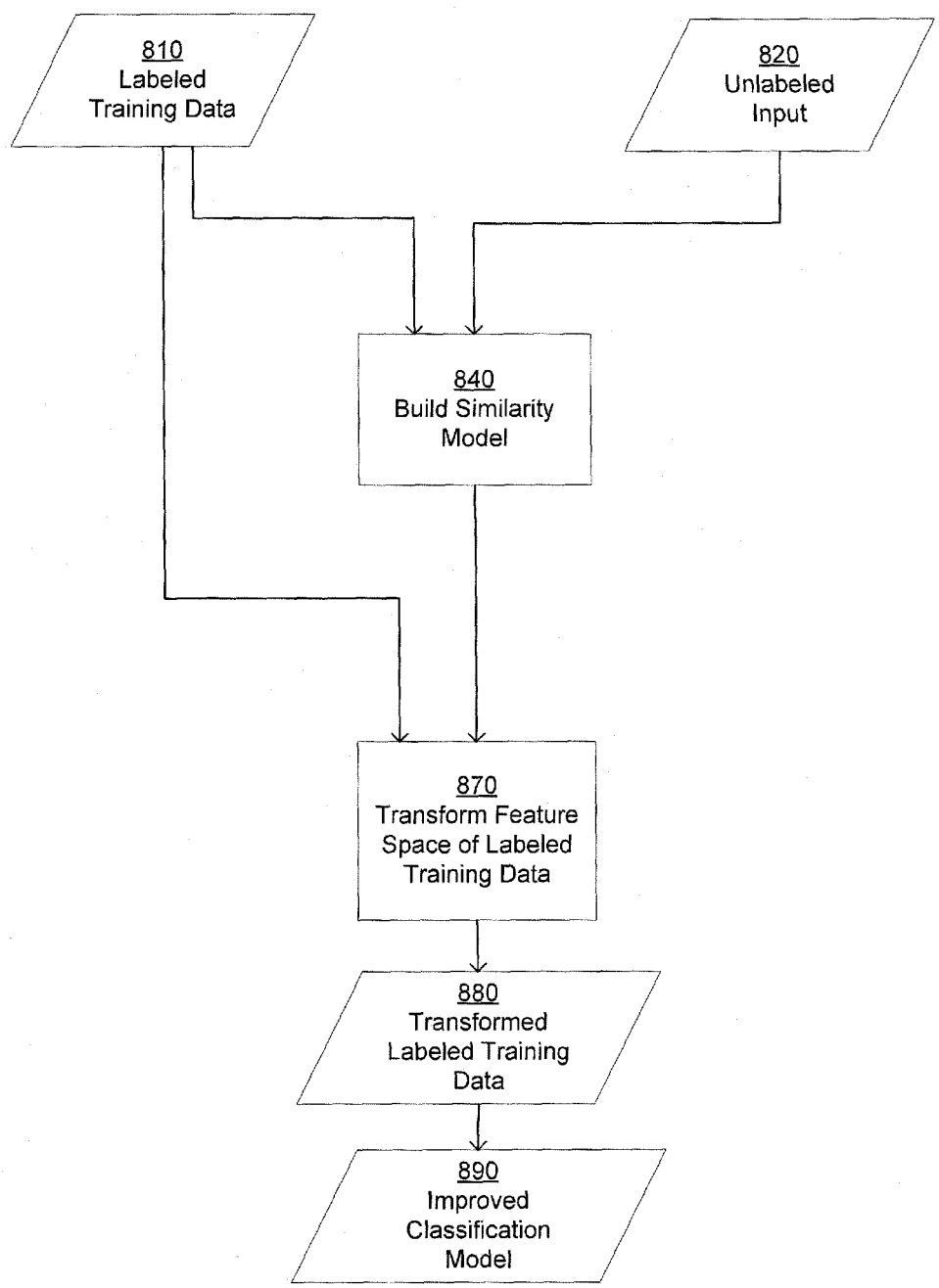
FIG. 8 is a flow chart of an exemplary method that builds an improved classification model based on a transformation of the feature space of labeled training data, in accordance with some embodiments of the present invention.

FIG. 8 depicts a flow chart of illustrative method 800 that builds an optimized classification model based on a transformation of the feature space of labeled training data. The inputs to method 800 are labeled training data 810 and unlabeled input 820. The output from method 800 is an improved classification model 890 to classify items of labeled training data and unlabeled input data into one of a plurality of classes, and expected to have improved performance in classifying the unlabeled test input.

In act 840, labeled training data 810 and unlabeled input 820 are used to build a similarity model. The similarity model may be built in any suitable way, examples of which are described above in relation to FIG. 5. In act 850, the similarity model is used to identify a subset of the labeled training data that is more similar to unlabeled input than the remainder of the labeled training data. Act 850 may be performed in any suitable way, examples of which are described above in relation to FIG. 5.

In act 870 the feature space of the labeled training data is transformed to create transformed labeled training data 880. Transformation of the feature space in act 870 may be performed to optimize the performance characteristics of the first classification model when classifying the unlabeled input 820. Since the transformed labeled training data has been transformed to have a greater degree of similarity to the unlabeled input than the original labeled training data 810, a classification model trained on the transformed training data may have increased performance when classifying the unlabeled input 820 compared with a classification model trained using the original labeled training data 810. The feature space transformation of the labeled training data may be performed in any suitable way. For example, the feature space of the labeled training data may be transformed based on desired performance characteristics of the improved classification model.

Transformation of the feature space of the labeled training data may comprise any suitable mathematical transformation of the N-dimensional feature space. For example, the transformation of the feature space may be via a linear transformation, an affine transformation, or any other suitable transformation.

In an illustrative example described further below, the feature space transformation is determined based on user input. For example, the feature space transformation may be determined by user interaction via a user interface (e.g., a GUI) that presents one or more performance characteristics of the classification model. Alternatively or in addition, a user may determine the feature space transformation by interacting with a GUI (or other user interface) presenting a DET curve representing the classification model's performance on the subset of labeled training data. In some embodiments, the DET curve may be modified to optimize the performance of the classification model. As two non-limiting examples, the DET curve may be modified to lower the false accept probability at the cost of increasing the false reject probability, or vice versa.

As a non-limiting example technique for performing a feature space transformation, the transformation may be determined by assuming that the false accept probability values and false reject probability values for a binary classification model are distributed as Gaussians. A feature space transformation may then be determined by optimizing the following expression:

$$A^* = \operatorname{argmin}_A \left[\frac{\sigma_1(A)}{\sigma_2(A)}\right] w_R + \left[\frac{\mu_1(A) - \mu_2(A)}{\sigma_2(A)}\right] w_D \quad \text{(Equation 20)}$$

where $\mu_1(A)$ and $\mu_2(A)$ are mean functions of the data points in class 1 and class 2 respectively, $\sigma_1(A)$ and $\sigma_2(A)$ are variance functions of the data points in class 1 and class 2 respectively, $w_R$ and $w_D$ are tunable parameters chosen based on desired performance characteristics, and A is the feature space transformation. The mean and variance functions represent some measure of how effectively the classification model is assigning class labels 1 and 2 to the labeled training data. The exact form of the mean and variance functions depends on the specific classifier being used.

Figure 9:
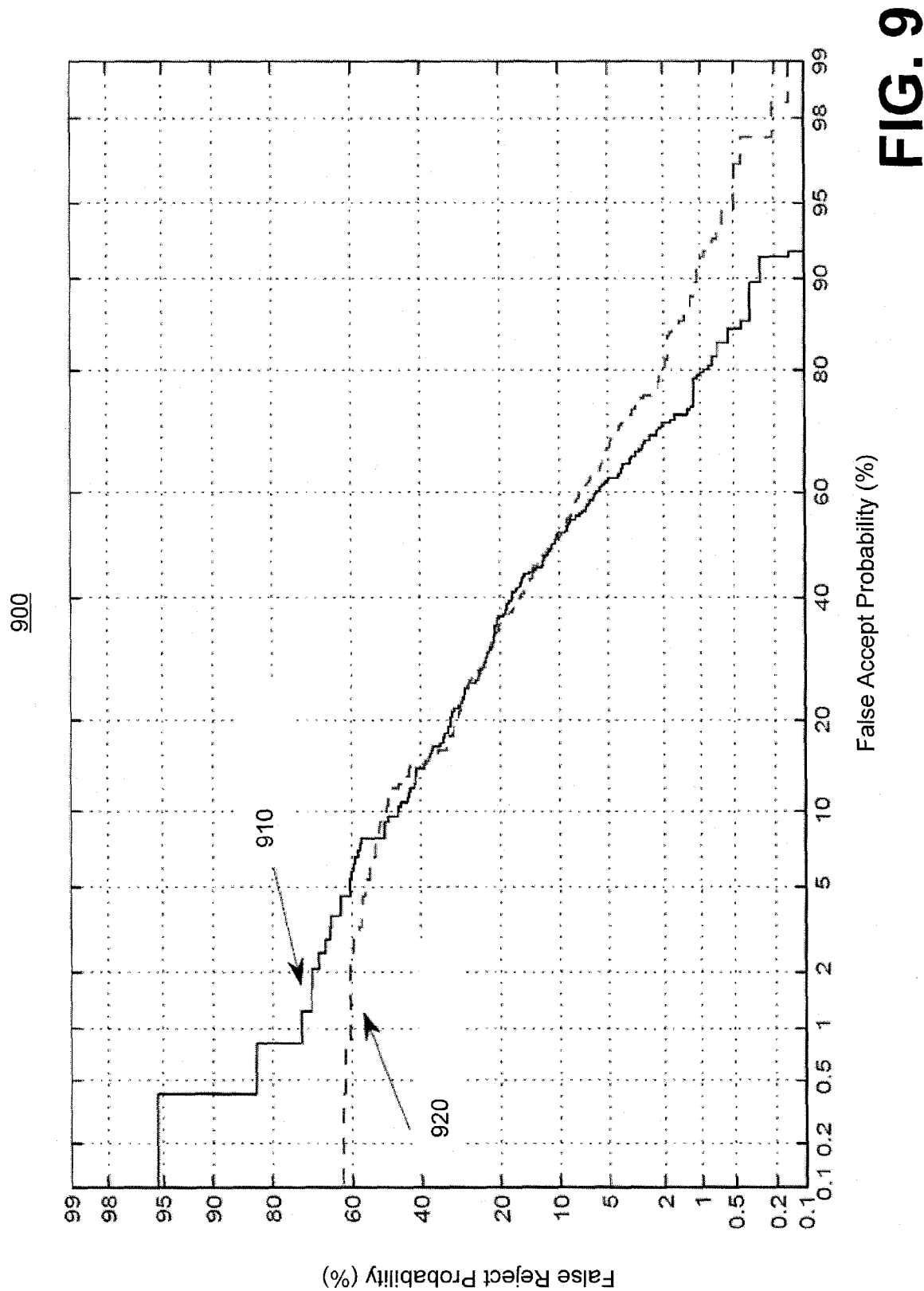
FIG. 9 is a plot of an exemplary method for the optimizing of classification model performance characteristics, in accordance with some embodiments of the present invention.

In effect, the term $$\left[\frac{\sigma_1(A)}{\sigma_2(A)}\right]$$

in Equation 20 determines the slope of solid line 910 in FIG. 9, and the term $$\left[\frac{\mu_1(A) - \mu_2(A)}{\sigma_2(A)}\right]$$

determines the vertical offset of solid line 910. Accordingly, $w_R$ and $w_D$ can be used to modify the slope and vertical offset of the DET curve shown in FIG. 9. For example, a positive value of $w_R$ may be used to rotate the DET curve shown in FIG. 9 in a counterclockwise direction, and a negative value of $w_R$ may be used to rotate the DET curve shown in FIG. 9 in a clockwise direction. The performance of a classification model may thereby be altered based on desired performance characteristics by choosing suitable values for $w_R$ and $w_D$, and by determining the feature space transformation A that maximizes $A^*$ in Equation 20.

The form of the feature space transformation A depends on the type of classifier being used in the classification model. Any suitable classification model, such as a logistic regression or GMM classifier, may be used in conjunction with this method, as the techniques described herein are not limited to any particular type of classification model. The classifier being used also determines the forms of the functions $\mu_1(A)$, $\mu_2(A)$, $\sigma_1(A)$ and $\sigma_2(A)$.

As one example technique for determining A where the classifier is a GMM classifier, optimization of Equation 19 may be performed by generating functions for $\mu_1(A)$, $\mu_2(A)$, $\sigma_1(A)$ and $\sigma_2(A)$ which generate a 'score' for each item of labeled training data, weighted by the posteriors provided by Equation 7. In this example, the data is modeled as two sources, wherein one source generates a feature space that comprises both the labeled training data and the unlabeled input, and the other source generates regions of the feature space that are unique to the training data, as described above.

The technique described below uses the model comprising two sources, and in particular uses model parameters corresponding to the source identified as generating a feature space that comprises both the labeled training data and the unlabeled input to determine the transformation to the feature space of the labeled training data. In the present example, the two sources are modeled by two GMMs as described above, although the process of determining the transformation may be used in conjunction with any method of modeling the training and test data.

The function used to generate scores for the mean and variance of the labeled training data may comprise any suitable function. As one example, mean score and variance of the scores for each class label are shown below. The mean score for class label i is given by:

$$\mu_i = \frac{1}{N} \sum_{x_d \in i} \left[\sum_{k=1}^{M_{s_1}} \gamma_{s_1 k}^{x_d}\right] [f_2(d, A) - f_1(d, A)] \quad \text{(Equation 21)}$$

where $f_1(d, A)$ and $f_2(d, A)$ are given by:

$$f_1(d, A) = \sum_d \log \sum_k p(k \mid H_1) \quad \text{(Equation 22)}$$

$$\exp\left(-\frac{1}{2}(Ax_t - \mu_{k,H_1})^T \sum_{k,H_1}^{-1} (Ax_t - \mu_{k,H_1})\right)$$

$$f_2(d, A) = \sum_d \log \sum_k p(k \mid H_2)$$

$$\exp\left(-\frac{1}{2}(Ax_t - \mu_{k,H_2})^T \sum_{k,H_2}^{-1} (Ax_t - \mu_{k,H_2})\right)$$

and where the posteriors $\gamma_{s_1 k}^{x_d}$ (described by Equation 7 where s=1) are specific to the underlying source 1 model (i.e., they are based on whatever model is being used to model the source that generates the feature space that comprises both the labeled training data and the unlabeled input) and binary classes $\gamma_i \in (H_1, H_2)$, where $H_2$ is the class representing the correct label for feature vector $x_d$, and where is $H_1$ the incorrect class label for the feature vector.

Equation 21 indicates a measure of how correctly the classifier is matching class labels to feature vectors of the training feature space for class label i, weighted by the posteriors $\gamma_{s_1 k}^{x_d}$. The posterior weighting is added so that feature vectors which provide a greater contribution to the output of the classification model provide a greater output to the mean score. For example, a feature vector with a small posterior value provides a small contribution to the output of the classification model. When determining a transformation of the labeled training data, this feature vector is weighted to have a smaller contribution to that determination than feature vectors with larger posterior values.

We may also write the variance of the score for class label i:

$$\sigma_i = \frac{1}{N} \sum_{x_d \in i} \left\{\left[\sum_{k=1}^{M_{s_1}} \gamma_{s_1 k}^{x_d}\right] [f_2(d, A) - f_1(d, A)]\right\}^2 - \quad \text{(Equation 23)}$$

$$\frac{1}{N_2}\left\{\sum_{x_d \in i}\left[\sum_{k=1}^{M_{s_1}} \gamma_{s_1 k}^{x_d}\right][f_2(d, A) - f_1(d, A)]\right\}^2$$

where the notation of Equation 23 is identical to that used in Equations 21 and 22 above.

To determine the transformation A, Equation 20 is minimized with respect to A, using Equations 21 and 23 to provide $\mu_1$ (A), $\mu_2$ (A), $\Gamma_i$ (A) and $\sigma_2$ (A). Determining the value of A that minimizes Equation 20 may be performed via any suitable method. For example, Newton's method, the Conjugate Gradient method, or any suitable technique may be used. Once the transformation A has been determined, this transformation may be applied to the labeled training data, and an optimized classification model may be trained using the transformed labeled training data. Alternatively, or in addition, the transformed labeled training data may be provided as input to a classification model, such as a classification model trained using labeled training data 810.

It should be appreciated that the above technique is provided merely as an illustrative example, and that any method of determining a feature space transformation may be used in method 800.

The feature space transformation is applied to the labeled training data in act 870 to build transformed labeled training data 880. Transformed labeled training data 880 comprises the same labels and weights as labeled training data 810, but one or more features of one or more items of labeled training data have different values such that the transformed labeled training data 880 is more similar to unlabeled input 820 than the labeled training data 810. In act 890, an optimized classification model is built using transformed labeled training data 880. Optimized classification model 890 may be trained via any method, examples of which are described above.

The techniques described above (including the methods described in FIGS. 4-8) may be implemented together, alone or in any combination. Aspects of the present invention are not limited to the specific embodiments described above.

In one embodiment, the performance characteristics of a classification model are presented to a user. FIG. 9 depicts the performance characteristics of a classification model as a DET curve in plot 900. Solid line 910 depicts the performance characteristics of a classification model as a DET curve. Dashed line 920 depicts an example of the desired performance characteristics of the classification model as a DET curve. The desired performance characteristics may be determined in any suitable way, including automatically by a computing device, or by a user specifying them.

Plot 900 may be provided to a user in any suitable way (e.g., on a display screen via a computing device, via a printout, etc.). The data represented by plot 900 may be stored in one or more storage devices of a computing system (e.g., a disk drive or memory).

In accordance with one embodiment, a user interface is provided that allows desired performance characteristics to be entered by a user interacting with plot 900 by clicking on a screen, by entering values into a computing device, or in any other suitable way. Desired performance characteristics may also be determined automatically based on one or more criteria. For example, a computing device may be programmed to minimize the false reject probability over a particular range of false accept probabilities. However, aspects of the present invention are not limited to these particular techniques, as any technique for providing an indication of desired performance characteristics may be used.

In some embodiments, a feature space transformation is determined based upon desired performance characteristics. This may be performed to transform labeled training data into transformed labeled training data, so that a classification model trained on the transformed labeled training data may perform better at classifying the unlabeled data than a classification model trained on the original labeled training data, as described above. A feature space transformation determined based on desired performance characteristics may be generated via any suitable technique, examples of which are discussed above in relation to FIG. 8. As one non-limiting example, a user interface may be used to provide an indication of the values of $w_R$ and $w_D$ in Equation 20.

The above-described example of improving a classification model for a distribution of test data may be combined with the techniques described above, to provide for the presentation of the performance of a classification model on unlabeled input in addition to improving performance of the classification model on the unlabeled input.

Figure 10:
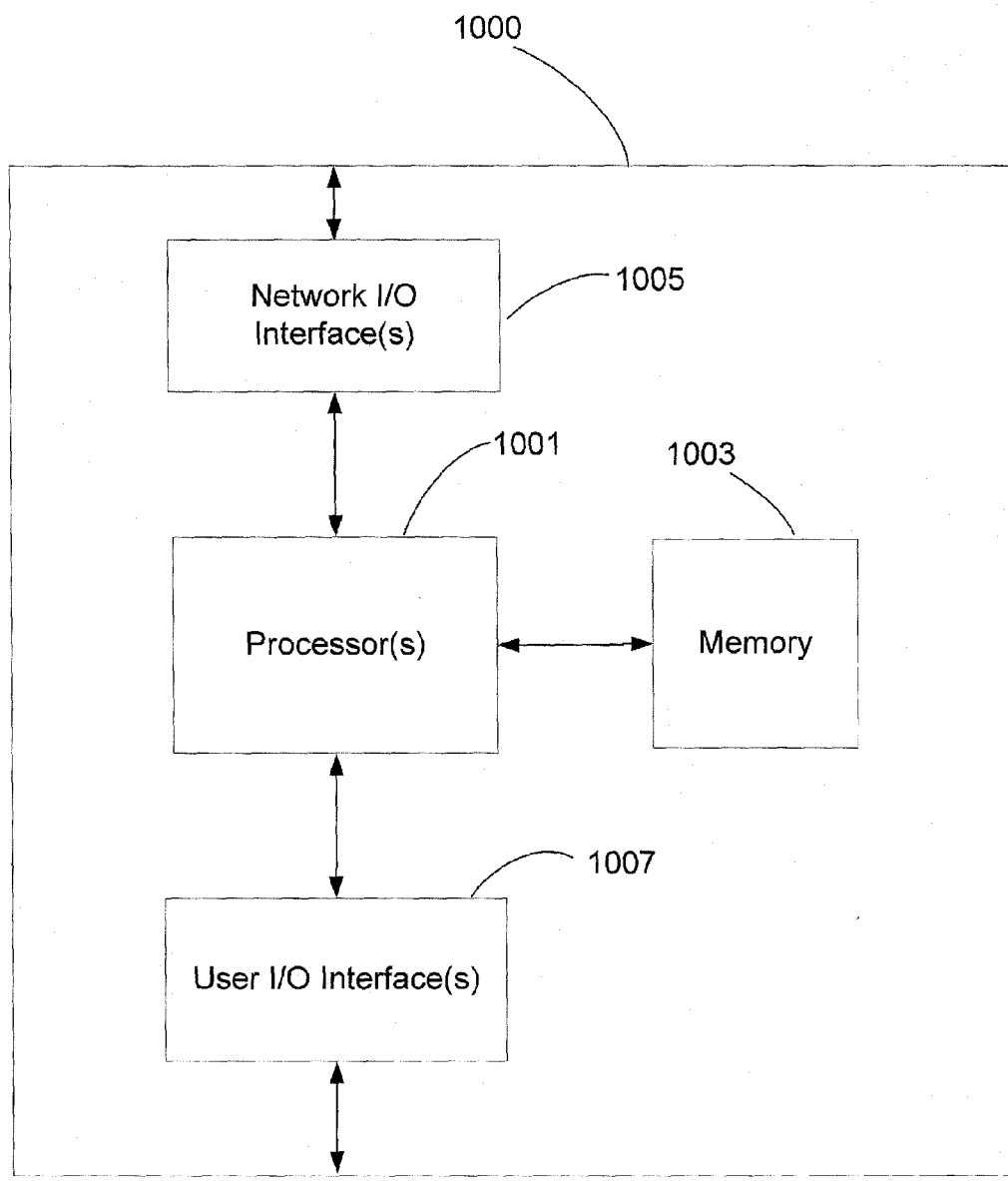
FIG. 10 is a schematic of a computing device suitable for use in performing embodiments of the present invention.

FIG. 10 is a block diagram of an illustrative computing device 1000 that may be used to implement any of the above-described techniques. Computing device 1000 may include one or more processors 1001 and one or more tangible, non-transitory computer-readable storage media (e.g., memory 1003). Memory 1003 may store, in a tangible non-transitory computer-recordable medium, computer program instructions that implement any of the above-described functionality. Processor(s) 1001 may be coupled to memory 1003 and may execute such computer program instructions to cause the functionality to be realized and performed.

Computing device 1000 may also include a network input/output (I/O) interface 1005 via which the computing device may communicate with other computers (e.g., over a network), and may also include one or more user I/O interfaces 1007, via which the computer may provide output to and receive input from a user. The user I/O interfaces may include devices such as a keyboard, a mouse, a microphone, a display device (e.g., a monitor or touch screen), speakers, a camera, and/or various other types of I/O devices.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of embodiments of the present invention comprises at least one computer-recordable medium (e.g., a computer memory, a floppy disk, a compact disk, a magnetic tape, or other tangible, non-transitory computer-recordable medium) encoded with a computer program (i.e., a plurality of instructions) which, when executed on one or more processors, performs the above-discussed functions of one or more embodiments of the present invention. The computer-recordable medium can be transportable such that the program stored thereon can be loaded onto any computer resource to implement aspects of the present invention discussed herein. In addition, it should be appreciated that the reference to a computer program which, when executed, performs any of the above-discussed functions, is not limited to an application program running on a host computer. Rather, the term computer program is used herein in a generic sense to reference any type of computer code (e.g., software or microcode) that can be employed to program one or more processors to implement above-discussed aspects of the present invention.

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method of processing a first classification model that classifies an input into one of a plurality of classes, wherein the first classification model was built using labeled training data having a first set of weights, wherein each item of labeled training data is labeled with one of the plurality of classes, the method comprising acts of:
    (A) obtaining unlabeled input for the first classification model;
    (B) using the unlabeled input to reweight the labeled training data to have a second set of weights that is different from the first set of weights by:
        building a similarity model that represents similarities between the unlabeled input and the labeled training data; and
        reweighting the labeled training data to have the second set of weights based on the similarities between the unlabeled input and the labeled training data indicated by the similarity model; and
    (C) using the labeled training data reweighted according to the second set of weights to:
        retrain the first classification model; and/or
        build a second classification model.

2. The method of claim 1, wherein the act (B) comprises using the unlabeled input to reweight the labeled training data by changing weight values for at least a subset of the labeled training data.

3. A tangible computer-recordable medium having a plurality of instructions embodied therein, wherein the plurality of instructions, when executed by a processor, cause a machine to perform a method of processing a first classification model that classifies an input into one of a plurality of classes, wherein the first classification model was built using labeled training data having a first set of weights, wherein each item of labeled training data is labeled with one of the plurality of classes, the method comprising acts of:
    (A) obtaining unlabeled input for the first classification model;
    (B) using the unlabeled input to reweight the labeled training data to have a second set of weights that is different from the first set of weights by:
        building a similarity model that represents similarities between the unlabeled input and the labeled training data and
        reweighting the labeled training data to have the second set of weights based on the similarities between the unlabeled input and the labeled training data indicated by the similarity model; and
    (C) using the labeled training data reweighted according to the second set of weights to:
        retrain the first classification model; and/or
        build a second classification model.

4. The tangible computer-recordable medium of claim 3, wherein the act (B) comprises using the unlabeled input to reweight the labeled training data by changing weight values for at least a subset of the labeled training data.

* * * * *